US011842718B2

(12) United States Patent
Silverzweig

(10) Patent No.: US 11,842,718 B2
(45) Date of Patent: Dec. 12, 2023

(54) UNAMBIGUOUS PHONICS SYSTEM

(71) Applicant: TinyIvy, Inc., New York City, NY (US)

(72) Inventor: Zachary Silverzweig, New York City, NY (US)

(73) Assignee: TINYIVY, INC., New York, NY (US)

(*) Notice: Subject to any disclaimer, the term of this patent is extended or adjusted under 35 U.S.C. 154(b) by 34 days.

(21) Appl. No.: 17/117,849

(22) Filed: Dec. 10, 2020

(65) Prior Publication Data

US 2021/0183361 A1    Jun. 17, 2021

Related U.S. Application Data

(60) Provisional application No. 62/946,834, filed on Dec. 11, 2019.

(51) Int. Cl.
*G10L 13/08* (2013.01)
*G10L 13/04* (2013.01)

(52) U.S. Cl.
CPC .............. *G10L 13/08* (2013.01); *G10L 13/04* (2013.01)

(58) Field of Classification Search
None
See application file for complete search history.

(56) References Cited

U.S. PATENT DOCUMENTS

| 5,429,513 | A  | * | 7/1995  | Diaz-Plaza | G09B 5/062 |
|           |    |   |         |            | 434/167    |
| 6,377,925 | B1 | * | 4/2002  | Greene, Jr. | G10L 21/06 |
|           |    |   |         |            | 704/235    |
| 8,744,855 | B1 | * | 6/2014  | Rausch     | G09B 19/06 |
|           |    |   |         |            | 434/156    |
| 10,460,032| B2 | * | 10/2019 | Catalano   | H04L 51/52 |
| 10,902,395| B1 | * | 1/2021  | Knas       | G06F 3/011 |
| 2005/0102143| A1 | * | 5/2005 | Woodward   | G09B 19/08 |
|           |    |   |         |            | 704/254    |
| 2006/0004564| A1 | * | 1/2006 | Aronowitz  | G06F 40/242|
|           |    |   |         |            | 704/10     |
| 2006/0031069| A1 | * | 2/2006 | Huang      | G10L 13/08 |
|           |    |   |         |            | 704/243    |
| 2009/0076821| A1 | * | 3/2009 | Brenner    | G06F 16/64 |
|           |    |   |         |            | 707/999.001|

(Continued)

*Primary Examiner* — Andrew C Flanders
*Assistant Examiner* — Jonathan Ernesto Amaya Hernandez
(74) *Attorney, Agent, or Firm* — NIXON PEABODY LLP

(57) ABSTRACT

An unambiguous phonics system (UPS) is capable of presenting text in a format with unambiguous pronunciation. The system can translate input text written in a given language (e.g., English) into a UPS representation of the text written in a UPS alphabet. A unique UPS grapheme can be used to represent each unique grapheme-phoneme combination in the input text. Thus, each letter of the input text is represented in the UPS spelling and each letter of the UPS spelling unambiguously indicates the phoneme used. For all the various grapheme-phoneme combinations for a given input grapheme, the corresponding UPS graphemes can be constructed to have visual similarity with the given input grapheme, thus easing an eventual transition from UPS spelling to traditional spelling. The UPS can include translation, complexity scoring, word/phoneme-grapheme searching, and other module. The UPS can also include techniques to provide efficient, level-based training of the UPS alphabet.

20 Claims, 17 Drawing Sheets

(56) References Cited

U.S. PATENT DOCUMENTS

2013/0253903 A1* 9/2013 Stephen ................ G06F 40/58
  704/9
2016/0358596 A1* 12/2016 Singh ................ G10L 13/08
2021/0020161 A1* 1/2021 Gao ................ G10L 13/08

* cited by examiner

202 → q: quick ūníque

204 → j: judge năvajo

206 → d: dög bridge

208 → ālíên happy

210 → all dög

212 → lion agrēe jacket

```
Level 1:  t i m a c p
Level 2:  n ē l s ī b
Level 3:  r ā ō o d ý
Level 4:  th ś e ŏ à sh
          + e u g a o l h
          + i s t y k c r n
          + w f p d m b z
          + q j v x
Level 5:  h f g w ŕ ẙ
Level 6:  u â ô v k ȯ
Level 7:  ê y ï ȯ ä ė
Level 8:  ch ç î th á ó
Level 9:  é ḓ z ŭ ḷ ḡ
Level 10: j ø w̌ x ū t
Level 11: q y s ň ú ő
Level 12: gh ï c ť ph z̧
Level 13: ŝ ć ů a ű ĝ
Level 14: ḓ z ǰ ů å x̌
Level 15: b ï f
```

FIG. 12

UNAMBIGUOUS PHONICS SYSTEM

CROSS REFERENCE TO RELATED APPLICATIONS

The present application claims the benefit of U.S. Provisional Patent Application No. 62/946,834 filed Dec. 11, 2019 and entitled "Learn to Read with an Unambiguous Phonics System based on Unique Grapheme/Phoneme Pair Characters," which is hereby incorporated by reference in its entirety.

TECHNICAL FIELD

The present disclosure relates to language systems generally and more specifically to systems and methods for representing, translating, and training phonics based on unique grapheme-phoneme pairs.

BACKGROUND

Literacy refers to the ability to read, write and understand printed material. Large percentages of children grow up not knowing how to read, which can lead to difficulties later in life. Children whose parents have low literacy levels have a much higher chance of being at the lowest reading levels themselves. Further, many adults are unable to read. Improved literacy training for children and adults can generate significant economic value for the individuals who learn to read, as well as the countries in which those individuals reside.

One practical matter at the heart of both children and adults not being able to learn to read is the lack of a clear, consistent relationship between the vast majority of letters printed on the page and the sounds made for each word. While there are some letter patterns common in English pronunciation, a multitude of exceptions exist, with no hard rules. Nearly any pattern taught to aid pronunciation and spelling has an exception, such as "I before E except after C, unless you are 'weird' or 'feisty;'" and "Pronounce long vowel sounds when there is a Vowel-Consonant-'E' structure, except where there is 'massive love.'" Often the exceptions appear in text far more frequently than words that follow the rule.

A grapheme represents the smallest meaningful contrastive unit in a writing system. A phoneme represents the smallest unit of sound. Most phonetic guides to pronouncing the English language include 39 to 55 phonemes.

Detailed studies of the Phoneme-Grapheme relationships have identified 229 graphemes that can be used to represent the various sounds of English, which is many more than the 26 letters that are commonly taught to understand English. Many of these English graphemes look exactly the same, but represent different sounds, with no visual indication as to why they are different. While various systems do exist to aid the reader in pronouncing English words, these systems are not intuitive to learn, are not transferable to the written word on the page, and do not educate early learners in phonemic awareness, which is an important basis for learning phonics. Additionally, current phonemic instruction based on these systems, whether classroom, print, or digital, is not sufficiently effective. There is a need for more efficient tools and systems to achieve significant reading comprehension gains, such as for early learners, dyslexic learners, English as a Second Language (ESL) learners, or adults who are illiterate.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a method, comprising: receiving input text, wherein the input text comprises a string of original graphemes in an original alphabet; generating a string of grapheme-phoneme combinations from the string of original graphemes; translating the string of grapheme-phoneme combinations into translation text using a translation alphabet, wherein the translation alphabet comprises a unique grapheme for every possible unique grapheme-phoneme combination of the original alphabet; and outputting the translation text.

In some cases, the input text includes at least one silent letter, wherein the translated text includes a translated grapheme associated with the silent letter, wherein the translated grapheme associated with the silent letter is indicative that the translated grapheme is non-voiced. In some cases, for a given grapheme of the original alphabet that is associated with a set of multiple phonemes, the translation alphabet includes a set of translation graphemes, wherein each of the translation graphemes is associated with a respective one of the set of multiple phonemes, and wherein each of the translation graphemes shares a basic shape with the given grapheme.

In some cases, the input text contains a word having letters, and wherein generating the string of grapheme-phoneme combinations from the string of original graphemes includes: accessing a phonetic spelling database containing a plurality of phonetic spellings associated with a plurality of words to retrieve a phonetic spelling for the word; and applying the phonetic spelling to the string of original graphemes to identify a valid grapheme-phoneme spelling for the word. In some cases, the phonetic spelling contains a string of phonemes associated with the word, and wherein applying the phonetic spelling to the string of original graphemes to identify the valid grapheme-phoneme spelling for the word further includes: identifying, for each letter of the word, a set of allowable phonemes associated with the letter; and generating one or more valid grapheme-phoneme spellings for the word, wherein generating a valid grapheme-phoneme spelling for the word includes identifying, for each combination of each letter of the word and each phoneme of the string of phonemes, a match between the given phoneme and the set of allowable phonemes associated with the given letter. In some cases, applying the phonetic spelling to the string of original graphemes to identify the valid grapheme-phoneme spelling for the word further includes: outputting at least one of the one or more valid grapheme-phoneme spellings; receiving selection information associated with the one or more valid grapheme-phoneme spellings; and selecting one of the one or more valid grapheme-phoneme spellings using the selection information.

In some cases, applying the phonetic spelling to the string of original graphemes to identify the valid grapheme-phoneme spelling for the word further includes: identifying a first spelling and a second spelling from the one or more valid grapheme-phoneme spellings; identifying an ambiguous phoneme from the phonetic spelling of the word, wherein the ambiguous phoneme is associated with a first letter in the first spelling and a second letter in the second spelling, wherein the first letter is different than the second letter; accessing phoneme-letter frequency information, wherein the phoneme-letter frequency information includes a frequency of which the ambiguous phoneme is represented by the first letter and a frequency of which the ambiguous phoneme is represented by the second letter; and selecting one of the first spelling and the second spelling based on the phoneme-letter frequency information. In some cases, the first spelling is selected when the frequency of which the ambiguous phoneme is represented by the first letter is greater than the frequency of which the ambiguous phoneme is represented by the second letter, and wherein the second spelling is selected when the frequency of which the ambiguous phoneme is represented by the second letter is greater than the frequency of which the ambiguous phoneme is represented by the first letter. In some cases, the phoneme-letter frequency information is generated by analyzing a collection of literary sources associated with the original alphabet to determine frequencies of which a given phoneme is represented by each letter of the original alphabet.

In some cases, the method further comprises generating, for each grapheme-phoneme combination of the string of grapheme-phoneme combinations, an individual complexity score; determining the highest individual complexity score from the individual complexity scores; and outputting the individual complexity score. In some cases, the method further comprises identifying the grapheme-phoneme combination associated with the highest individual complexity score. In some cases, the method further comprises determining a reading level based on the highest individual complexity score; and outputting the reading level. In some cases, the method further comprises receiving a maximum desired complexity score; and identifying a subset of grapheme-phoneme combinations for the string of grapheme-phoneme combinations using the maximum desired complexity score and the individual complexity scores, wherein each grapheme-phoneme combination of the subset of grapheme-phoneme combinations is associated with an individual complexity score that exceeds the maximum desired complexity score.

In some cases, the method further comprises identifying a complex word from one or more words of the translated text, wherein the complex word includes one of the subset of grapheme-phoneme combinations; and suggesting a replacement word for the complex word using the complex word, wherein all grapheme-phoneme combinations of the replacement word have individual complexity scores at or below the maximum desired complexity score. In some cases, the method further comprises generating, for a plurality of combinations of adjacent graphemes of the translated text, a combined complexity score; determining the highest combined complexity score from the combined complexity scores; and outputting the combined complexity score. In some cases, the method further comprises identifying the combination of adjacent graphemes associated with the highest individual complexity score. In some cases, the method further comprises determining a reading level based on the highest combined complexity score; and outputting the reading level. In some cases, each of the combinations of adjacent graphemes is a word, and wherein the combined complexity score is a word complexity score. In some cases, the method further comprises receiving a maximum desired complexity score; and identifying a complex word from the translated text, wherein the complex word has a word complexity score that exceeds the maximum desired complexity score. In some cases, the method further comprises suggesting a replacement word for the complex word using the complex word, wherein the replacement word has a word complexity score at or below the maximum desired complexity score.

In some cases, the string of original graphemes of the input text contains at least a first input grapheme and a second input grapheme, wherein the first input grapheme is visually indistinguishable from the second input grapheme, wherein the first input grapheme is associated with a first phoneme, wherein the second input grapheme is associated with a second phoneme, and wherein the first phoneme is different from the second phoneme.

Embodiments of the present disclosure include a system comprising: one or more data processors; and a non-transitory computer-readable storage medium containing instructions which, when executed on the one or more data processors, cause the one or more data processors to perform operations to implement the method described above.

Embodiments of the present disclosure include a computer-program product tangible embodied in a non-transitory machine-readable storage medium, including instructions which, when executed by a computer, cause the computer to carry out the method described above.

BRIEF DESCRIPTION OF THE DRAWINGS

The specification makes reference to the following appended figures, in which use of like reference numerals in different figures is intended to illustrate like or analogous components.

FIG. 2 is a diagram depicting several example words written in UPS spelling according to certain aspects of the present disclosure.

FIG. 9 is a chart depicting a set of example UPS graphemes according to certain aspects of the present disclosure.

FIG. 12 is a diagram depicting a collection of UPS graphemes segmented into fifteen levels according to certain aspects of the present disclosure.

DETAILED DESCRIPTION

Figure 1:
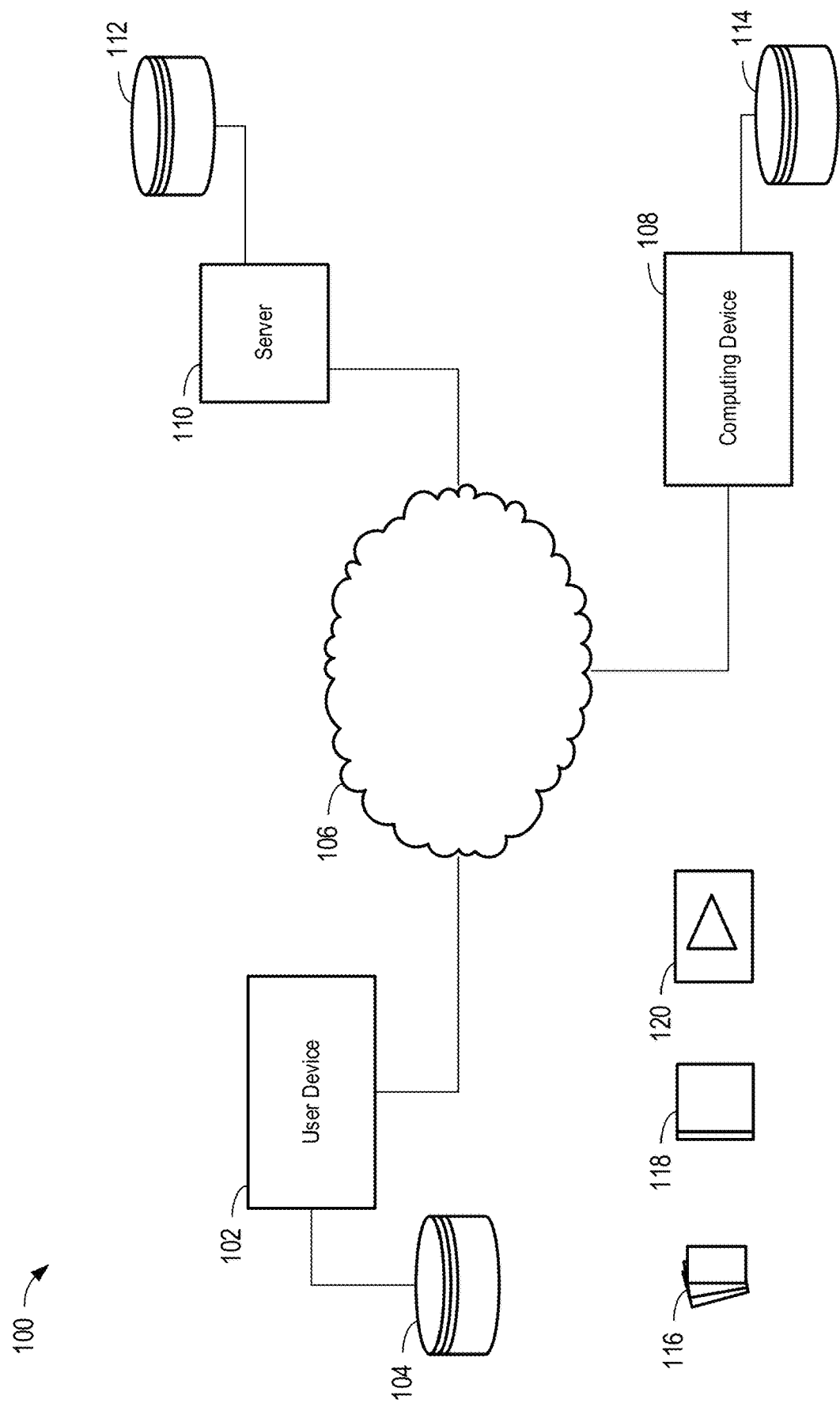
FIG. 1 is a schematic diagram depicting an environment for using an unambiguous phonics system (UPS) according to certain aspects of the present disclosure.

Certain aspects and features of the present disclosure relate to an unambiguous phonics system (UPS) capable of presenting text in a format with unambiguous pronunciation. The system can translate input text written in a given language (e.g., English) into a UPS representation of the text written in a UPS alphabet. A unique UPS grapheme can be used to represent each unique grapheme-phoneme combination in the input text. Thus, each letter of the input text is represented in the UPS spelling and each letter of the UPS spelling unambiguously indicates the phoneme used. For all the various grapheme-phoneme combinations for a given input grapheme, the corresponding UPS graphemes can be constructed to have visual similarity with the given input grapheme, thus easing an eventual transition from UPS spelling to traditional spelling. The UPS can include different modules for translating text, scoring complexity of text, searching for words or phoneme-grapheme combinations, and the like. The UPS can also include techniques to provide efficient, level-based training of the UPS alphabet.

The UPS can be leveraged in various different languages with various different alphabets. For ease of explanation, the UPS is described herein with reference to English. Because of the pronunciation ambiguity inherent in the English alphabet and alphabets of other languages, individuals learning to read often struggle to understand how to pronounce new words. As an example, a child learning to read English may have significant difficulty reading out loud the phrase "My great friend bear lives right there." However, if the child were attempting to read a UPS spelling of that same phrase, each of the phonemes would be easily and quickly distinguishable due to the use of unique UPS graphemes, thus permitting the child to sound out and read the sentence, even without assistance from others.

While there have been other "phonic alphabets" designed to teach phonetic reading, such phonic alphabets do not comprehensively address the challenges of English pronunciation and its impact on learning to read. Those phonic alphabets are very limited in that they do not have characters representing every unique phoneme in the language, do not have a process for parsing words for phoneme/grapheme pairs, cannot produce text digitally in instructional format, deliver reading materials based on phonemic frequency and complexity, and are not applicable to teaching a foreign language.

The UPS can solve these and other problems. The UPS alphabet is an extended version of the alphabet of the underlying language (e.g., English). Each possible phoneme for a given grapheme in the underlying language is represented by a unique, corresponding UPS grapheme sharing visual similarity with the given grapheme. Thus, each UPS grapheme is paired with only a single phoneme. Therefore, upon seeing a UPS grapheme, one using the system would know exactly which phoneme to pronounce.

Because words written with the UPS alphabet have unambiguous pronunciations, it can enable a student to read independently because the sound of each word is voiceable without guidance from a parent or teacher. Thus, young students can independently expand their vocabulary through independent reading. Further, use of the UPS alphabet can reduce frustration and stress levels of a learner, because the learner can decode words with confidence, knowing that there is only one possible pronunciation for every UPS grapheme, and that it will never change.

Also, use of the UPS alphabet can help ESL students improve pronunciation, at least because pronunciation guidance is naturally built into every word based on its unique UPS graphemes.

The UPS can be implemented in many fashions and with various modules for different functionality. In some cases, the UPS can be implemented on one or more computer systems, such as to facilitate translation functions (e.g., dynamic translation), complexity scoring (e.g., scoring complexity of words or phonemes and offering substitute words), learning platforms (e.g., dynamically adjusting learning modules), UPS alphabet generation, and the like.

The UPS can be based on a computer coded program that converts words and their standard pronunciations into a unique and proprietary orthographic code of graphemes. This UPS alphabet can include both upper- and lower-case letters (e.g., "D" and "d"), as well as silent letters (e.g., "e" as in fate) and letter combinations (e.g., "ch" as in choice). The UPS alphabet can be leveraged digitally in game format or in print or other media, resulting in an effective "learn to read system" for any audience.

The system utilizes distinctive grapheme-phoneme combinations, also known as grapheme-phoneme blocks, which are assigned to a character in the UPS Extended Alphabet, where each character visually indicates a distinct phoneme of the English language, including all exceptions in pronunciation. The grapheme-phoneme combination characters can be presented in various reading levels of increasing complexity. Complexity can be based largely on the frequency the given phoneme is found in the English language, as well as on the complexity of the word.

The UPS can be used to teach anyone to read, such as those over the age of two. UPS can facilitate understanding both phonics and its relation to the printed word. The UPS can be applied, for example, to early childhood and elementary school education, literacy programs for people of all ages, people with learning disabilities or who are learning English as a second language, as well as others.

UPS differs significantly from current phonetics approaches that teach reading, none of which eliminate all phonemic exceptions or map grapheme-phoneme combinations. The UPS can use a unique orthography (e.g., expanded from the standard Latin alphabet) that allows English to be read correctly, from left to right, without error and without exception. Because each UPS grapheme can only be associated with a single phoneme, there are no exceptions in how to pronounce a UPS grapheme. Unlike the standard English alphabet, where the grapheme "a" is associated with different phonemes in the words "cat" and "mate," each UPS grapheme is associated with only a single phoneme. Therefore, when seeing a given UPS grapheme, an individual using the UPS will immediately know how it should be pronounced.

Accents and errors of pronunciation are eliminated by explicitly encoding them in the written word, improving the speed at which the learner can obtain proficiency. Children can be introduced to the system at an early age and are taught to read using phonics and decoding, both essential to literacy success. The UPS can improve reading ability and/or literacy.

In some cases, UPS can utilize over one hundred distinct graphemes, each with a one to one relationship with each phoneme, including silent letters, created through the addition of various diacritical marks that easily differentiate phonemes, but allow for ready transition to reading words in the English alphabet.

In some cases, the UPS leverages the frequency with which a phoneme or word occurs in the English language. This frequency can be determined based on analysis of one or more appropriate corpora of data. For example, for teaching a child to read, the frequency data leveraged may be based on analysis of a collection of books and other reading materials designed for child-age individuals. In another example, the frequency data can be based on any analysis of any combination of dictionaries, books, websites, encyclopedias, technical manuals, and/or other sources of text.

This frequency data can be leveraged to determine a complexity of a phoneme or word. The more often a phoneme or word occurs in the corpus, the lower a complexity value it is assigned. Extremely rare phonemes or words can be assigned high complexity values. These complexity values can be used to build a UPS alphabet, by assigning lower complexity phonemes to visually simpler graphemes (e.g., with no, few, or small diacritical marks) and assigning higher complexity phonemes to graphemes that are more visually complex (e.g., with many and/or large diacritical marks). Additionally, in some cases, the diacritical mark selected for a given phoneme-grapheme combination can be used consistently for other phoneme-grapheme combinations sharing a same or similar pronunciation. Thus, separate traditional graphemes sharing the same phoneme can be indicated as such through the use of the same diacritical mark. For example, Y_AY ("Y" as in "My") can be denoted ŷ and I_AY ("I" as in "Right") can be denoted î.

These complexity values can be leveraged to start teaching a learner phonemes with relatively low complexity, then gradually increasing to more complex phonemes. The set of available phonemes can be split into different levels. A lowest level can contain a collection of relatively low complexity phonemes. Various words that can be spelled using only these relatively low complexity phonemes and their associated UPS graphemes can be initially taught to a learner until that learner is comfortable with the phonemes and UPS graphemes in that level. The learner can then progressively step to higher levels, learning a new set of phoneme/grapheme pairs at each level. Each level can make use of the phoneme/grapheme pairs of that level and the levels below. Thus, learners are initially exposed to the most common phonemes and their associated UPS graphemes and only progress to rare phonemes and their associated UPS graphemes after becoming sufficiently comfortable with the more common phoneme/grapheme pairs. By learning common phonemes first, the learner will be able to read a very large number of words after learning only a handful of grapheme-phoneme combinations. In an example, by the time a learner has mastered the first 30 grapheme-phoneme combinations, they are able to read over 20,000 words independently.

In some cases, the learner can interact with the UPS alphabet, learning the various levels of phoneme-grapheme combinations, via a computer game. The game can be stored locally or accessed via a network (e.g., the Internet). The game can use various settings, characters, stories, and interaction techniques to have a learner practice the phoneme-grapheme combinations associated with that particular level (and the levels below). In some cases, the game can allow a learner to select individual phoneme-grapheme combinations to learn. In some cases, the game can introduce the learner to phoneme-grapheme combinations one at a time. In some cases, the game can progress from learning individual phoneme-grapheme combinations, to learning full words, then to learning full sentences, then to learning full passages of text (e.g., stories).

The UPS alphabet, also known as the UPS Extended Alphabet, can be presented digitally on a computing device (e.g., smartphone, tablet, laptop, or the like) or used in physical print (e.g., flash cards, books and workbooks, and other visual media). In some cases, the UPS can include code that is executable by a computing device to generate the characters of the UPS alphabet on a display or other output device (e.g., printer).

As used herein, the term grapheme can include digraphs, such as a "Sh" grapheme indicating a digraph of the letters S and H, such as in the word "shore." To facilitate describing the various phonemes, this document makes use of a slash notation using the English alphabet to signify the phoneme. For example, the phonetic spelling of the word "Judge" can be written as "/j/ /uh/ /j/." Since each grapheme-phoneme combination in the English language is associated with a unique UPS grapheme, a given grapheme-phoneme combination can be written in block notation, which includes the grapheme of the underlying notation followed by an underscore and the phoneme. For silent letters, an indication can be made using forward slashes. For example, an indication of the grapheme-phoneme combination for the word "Judge" can be written in block notation as "J_J U_UH D_// G_J E_//."

Examples of block notation grapheme-phoneme pairs and word examples are provided in Table 1.

TABLE 1

| A_AA | Father | N_N | New |
| A_AE | Lap | O_AA | Otter |
| A_AH | Canoe | O_AH | Come |
| A_AO | Yawn | O_AO | Long |
| A_EH | Scary | O-AW | Cow |
| A_EY | Cake | O_OW | Go |
| B_B | Bake | O_OY | Toy |
| C_K | Cookie | O-UH | Wolf |
| C_S | Race | O_UW | Broom |
| C_SH | Ocean | P_P | Play |
| CH_CH | Lunch | Q_KW | Queen |
| D_D | Dog | R_ER | Bird |
| D_T | Asked | R_R | Read |
| E_// | Lake | S_S | Super |
| E_AH | Camel | S_Z | Cars |
| E_EH | Egg | SH_SH | Wish |

TABLE 1-continued

| | | | |
|---|---|---|---|
| E_EY | Ballet | T_SH | Nation |
| E_IH | Pretty | T_T | Tap |
| E_IY | Be | TH_DH | This |
| F_F | Fun | TH_TH | Both |
| G_G | Game | U_AH | Under |
| G_JH | Magic | U_UW | Fruit |
| GH_F | Tough | U_YUW | Human |
| H_HH | Hippo | V_V | Van |
| I_AH | Pit | W_UW | New |
| I_AY | Iron | W_W | Walk |
| I_IH | Igloo | X_KS | Mix |
| I_IY | Pizza | Y_AY | Cry |
| J-JH | Jump | Y_IY | Happy |
| K_K | Kiss | Y_Y | Yak |
| L_AHL | Table | Z_Z | Zoo |

UPS graphemes are generally created to share visual similarities with the grapheme of the underlying language. Therefore, various phonemes associated with the English letter "e" may be associated with corresponding UPS graphemes that are based on an English letter "e" (e.g., with the addition of various diacritical marks). In some cases, the UPS grapheme for a given grapheme-phoneme combination is identical to the given grapheme, although that need not always be the case. In an example, the UPS grapheme for O_AA (O as in "on") and O_OW (O as in "bony") may be written as "O" and "Ö", respectively. For silent letters, the corresponding UPS grapheme can be indicative that the letter is silent, such as by having the grapheme depicted as grayed out or semi-transparent, or having the grapheme include an "x" mark or other notation. For example, a silent "K" might be written as "K̸".

When UPS graphemes for a given grapheme-phoneme combination are based off the given grapheme and are visually similar to the given grapheme, a learner making use of the UPS alphabet can easily build accurate "word pictures" for various words, improving the learner's ability to sight read correctly in either the UPS alphabet or the traditional alphabet.

In some cases, the UPS graphemes can be constructed to make use of easy-to-write versions of certain levels, such as a single-story design for the letter "a," a simplified version of the letter "g" with a hook instead of a bowl, and a "q" with a hook. In some cases, the UPS graphemes can be constructed to improve distinguishability of certain sets of letters, such as the letters "ilj" and the letters "bdpq." In such cases, distinctive features, such as hooks, unique descenders, unique serifs, unique ascenders, and other such features can be used.

In some cases, the UPS alphabet can be constructed to minimize the total number of characters to be learned. For example, the /ER/ sound is commonly made in words ending in "ER", but also occasionally by "IR" as in BIRD. Therefore, instead of creating two unique UPS graphemes for "IR" and "ER," a single UPS grapheme can be created for the letter "R" making an /ER/ sound, thus allowing the "I" and the "E" in the "IR" and "ER" endings to be indicated as silent. For example, the word "BIRD" can be represented as "B_B I_// IR_ER D_D."

The UPS can be configured to disfavor complexity in grapheme-phoneme combinations. For example, in the word "JUDGE" having a phonetic spelling of "/j/ /uh/ /j/," it could be correct to indicate that either the "J" or the "G" makes the final /j/ sound. Thus, the word can be represented as either "J_J U_UH D_J G_// E_//" or "J_J U_UH D_// G_J E_//." To disfavor complexity, the UPS can identify the relative complexities of the D_J and G_J combinations, opting to choose the combination most often used. Since G_J (e.g., G as in Giraffe) is used more often than D_J (D as in Module), the UPS can opt to use the representation with the D_// and G_J combinations.

In some cases, the UPS can dynamically translate input text. For example, when incorporated into a word processing application, the UPS can permit a user to type using the English alphabet while automatically translating the typed text into the UPS alphabet. This automatic translation can occur in blocks or immediately after a word is finished. In some cases, the automatic translation can occur as the user types and before the user finishes a word, with the automatic translation picking UPS graphemes for each input letter based on the most likely phonetic spelling of the potential word, and updating, as necessary, the previous UPS graphemes of the word as the phonetic spelling changes or updates.

Some computing systems may not fully support display of the UPS Extended Alphabet on digital devices. Such devices may be able to display only a limited subset of variants of given letters. In addition, common functions such as sorting by name, or spellcheck, may be based on the existing limited character set. Therefore, to make full use of the Extended Alphabet, the UPS can include code to enable every variant of the Extended Alphabet characters to display easily on a screen, using simple keyboard input.

The UPS can include a translation module to facilitate translating English words into the UPS alphabet. The translator can identify each unique phoneme in an English word and convert it to an assigned corresponding unique grapheme in the extended alphabet, eliminating all phonemic exceptions. The translator can make use of a database that includes the phonetic spellings of English language words, and then map a specific relationship between the graphemes of the word and the phonemes those graphemes represent.

In some cases, the UPS can generate a database of UPS spellings for various English words. This database can be known as a UPS dictionary. Thus, a UPS translator can operate quickly by initially checking to see if the word's UPS spelling already exists in the database. If so, it can simply return the UPS spelling. If not, the translator can proceed with a process of generating the UPS spelling based on the phonetic spelling of the word. The phonetic spelling can be retrieved from a database of phonetic spellings (e.g., the Carnegie Mellon University Pronouncing Dictionary). In some cases, the phonetic spelling of an unknown word can be provided by a user and/or can be estimated. Estimating a phonetic spelling of a word can be based on phonetic rules and exceptions for the given language, from audio extraction and comparison of an audio sample known to contain the word, or based on machine learning techniques trained on phonetic spellings of other words in that language.

In some cases, the UPS dictionary can include one or more variant phonetic spellings for a given word. Variant phonetic spellings can account for variance in pronunciation (e.g., due to regional accents and variations in pronunciation schemes for similar languages, such as pronunciation differences between British, US, and Australian English). Variant phonetic spellings can also account for homographs (e.g., words with the same letters but different pronunciations), such as "READ" as in "I can read" or "I read a book." The variant phonetic spellings can be automatically selected based on context, or can be presented to the user for selection. In some cases, when a word has variant phonetic spellings, an indication can be provided, such as an underline presented under the word or having the word be highlighted or presented in a different color. Clicking on the word can open a menu to select the desired variant phonetic spelling.

The UPS can include a phoneme-grapheme combination search module. This search module can allow a user to search for a particular phoneme-grapheme combination. The UPS will then identify words (e.g., words form the UPS dictionary) that contain the requested phoneme-grapheme combination. Thus, if a learner is having difficulty with the A_AH combination, the learner can use the phoneme-grapheme combination search module to identify words that contain the A_AH combination, such as the word "zebra." Other factors can be used to narrow down the search, such as length of the word, presence or absence of other phoneme-grapheme combinations, complexity of the word, complexity of phonemes-grapheme combinations in the word, and the like.

The UPS can include a learning vocabulary module. The learning vocabulary module can keep track of the phoneme-grapheme combinations and/or words in which a learner has exhibited mastery or at least sufficient competence. These known phoneme-grapheme combinations and/or known words can be used to suggest reading material to the learner (e.g., reading material containing the known phoneme-grapheme combinations and/or known words) and/or provide further training to the learner. In some cases, these known phoneme-grapheme combinations and/or known words can be used to generate training exercises (e.g., selected words and/or generating text for the learner to read) that build on the learner's current skills.

In an example, if the learning vocabulary module knows that the learner has knowledge of the words "cat" and "map" and/or the phoneme-grapheme combinations of C_K, A_AE, T_T, M_M, and P_P, the system may try to teach the learner the word "mat" because the learner already knows the phoneme-grapheme combinations needed to read that word. This approach can reinforce known phoneme-grapheme combinations. Similarly, the system may try to teach the same learner the word "cacti" because the learner would only need to learn a single new phoneme-grapheme combination (I_AY) to pronounce the new word. This approach can be an easier way for a learner to grow to understand a new phoneme-grapheme combination.

The UPS can include a complexity scoring module. This module can be used to assign complexity values to words, phrases, books, websites, and other texts. The complexity values can be used to generate reading difficulty scores, to generate reading ability scores, to categorize materials into different reading levels, or to otherwise provide useful metrics to the general difficulty of a given text. The complexity values can be based on the frequency with which the phoneme-grapheme combinations are used in a given corpus of data. In some cases, the complexity scoring module can also make use of other metrics associated with a given corpus of data, such as frequency of a traditional grapheme. The frequency of phoneme-grapheme combinations can be determined in various contexts based on the given corpus of data. In some examples, the frequency can be based on frequency of use in a dictionary, frequency of use in early childhood literature, and frequency of use in the so-called "power words" that make up the bulk of written English (e.g., this, the, his, hers, and, or, put, etc.).

Complexity values for a given phoneme-grapheme combination can be used to establish a complexity value for a word. The complexity value for a word can be based on the highest complexity value of the phoneme-grapheme combinations that make up the word, based on an average of the various complexity values of the phoneme-grapheme combinations that make up the word, or based on other similar metrics. Likewise, complexity values for a larger text (e.g., a text containing multiple words, such as tens or hundreds of words) can be based on complexity values (e.g., highest complexity values, average complexity values, or the like) of words and/or phoneme-grapheme combinations that occur within the text.

In some cases, the complexity scoring module can also take into account the length of a word (e.g., number of letters and/or phonemes in the word) and/or text (e.g., number of letters, phonemes, and/or words in the text). For example, given two words that would otherwise have similar or identical complexity values, the longer word may be given a slightly higher complexity value.

In an example, the phoneme-grapheme combination S_Z is a commonly used combination, found in words such as "Is," "His," and "These." Thus, the S_Z combination and words containing that combination would generally have lower complexity scores. By contrast, the combination J_H such as found in the word "Navajo" or the combination Q_K such as found in the word "Plaque" are rare. Thus, the J_H and Q_K combinations and words containing those combinations would generally have higher complexity scores.

In some cases, the complexity scoring module can be used separately from and without the UPS alphabet, such as to simply provide a difficulty score associated with the phoneme-grapheme combinations used in a text written in a traditional alphabet.

In an example, a writer of a book can pass the text through the complexity scoring module to determine the book's difficulty level. In some cases, if the difficulty level is too high or low, the complexity scoring module can provide the writer with indications of especially infrequent or especially frequent phoneme-grapheme combinations (e.g., indications of the phoneme-grapheme combinations themselves or words containing them) that are present in the book's current text, and/or provide the writer with suggestions (e.g., suggested word choice changes, such as based on a thesaurus) to lower or raise the difficulty level. The writer can then publish the book along with an indication of the difficulty level (e.g., UPS Difficulty Level III). Thus, it becomes easy to identify whether or not the book will be too difficult or too easy for a given individual to read. In some cases, a learner may be using UPS to learn to read, in which case the learner may have achieved a particular reading level (e.g. UPS Reading Level III). In such a case, that learner may know that they would be able to read the book with the corresponding difficulty level.

The complexity scoring module can be especially useful to aid in word selection for early childhood readers, ESL students, remedial readers, and many others. UPS can also be used to evaluate a learner's ability to read text and/or decode UPS graphemes, then present them with text that is within their reading capability.

The complexity scoring module can be used to generate sets of grapheme-phoneme combinations used in level-based learning. In level-based learning, a learner may be exposed to only a small set of grapheme-phoneme combinations at a time. The learner can practice the grapheme-phoneme combinations and words using those combinations until they master the combinations or otherwise become sufficiently comfortable to move to the next level. At the next level, the learner will be exposed to an additional set of grapheme-phoneme combinations and words using those combinations and combinations from the previous level(s). The complexity scoring module can be used to configure which grapheme-phoneme combinations should be used at the different levels, favoring low-complexity grapheme-phoneme combinations at early levels and pushing high-complexity grapheme-phoneme combinations to later levels. In some cases, if desired, variation to sets of grapheme-phoneme combinations can be made to avoid learning similar versions of a single grapheme at the same time.

In an example, a reading level of level 1 may include the letters I-M-P-A-C-T because of their frequency of use in the English language and their "pure" sound. Words created from this set, such as CAT or MAP, are Level 1 words using simple sounds, and have a correspondingly low complexity score. Alternatively, the word OCEAN, contains the grapheme "C" making the /SH/ phoneme. The C as /SH/ phoneme occurs only 1.8% of the time the C is used in the dictionary, and 1% of the time it is used in print. From this type of data, the UPS can provide direct comparison of phonetic difficulty for each letter as it is used in the word. Thus, the phonetic difficulty of a word or larger text can be objectively measured.

This type of difficulty scoring is not based on school grade level or the like, but rather based on the frequency of appearance in the English language (or in a specific corpus) of the grapheme-phoneme combination. Thus, teaching a learner in this type of frequency order can enable the learner to increase or maximize the number of words the learner would be able to read at each step.

In some cases, the UPS described herein can be used to implement a digital game to facilitate teaching learners how to read. The game introduces phonemic awareness and simple words in a multi-level interactive system based on UPS translations of words to unique graphemes corresponding to phonemes. Progress through multiple levels is dependent on success at phonemic recognition, with progress being inhibited until a level is mastered (e.g., learned to a threshold level of mastery, such as a threshold percentage of correct responses). The game can include appealing characters who teach and provide feedback, rewards, and motivation. A character can orally guide a user through the game. The game can include various themes to promote engagement (e.g., an Ocean theme, a City theme, a Jungle theme, a Desert theme, a Farm theme, and the like). The game can automatically select level-appropriate words that are associated with each theme (e.g., the word "shell" may appear in the Ocean theme, whereas the word "shop" may appear in the City theme).

At an initial, basic level, the user can first learn phonetic awareness by viewing visual representations, or graphemes, in the UPS Extended Alphabet. In some cases, the graphemes are combined into words and sentences appropriate to the theme and/or the interests, age level, or purpose of the learner. At some times (e.g., at early levels), the game can favor presenting words for which an image or graphic is available (e.g., an image of a cat for the word "cat"), however at other times (e.g., at later levels), the game can present words without images or graphics associated with the word. As the learner progresses up the ladder of levels, the difficulty of the words can increase. As the reader progresses up the rungs of the reading ladder, the words can include less frequently encountered phonemes, introducing words more difficult to spell or sound out. The words are scored individually for difficulty (e.g., via the complexity scoring module).

In some cases, as the learner progresses to higher levels, the game can begin introducing words with traditional spelling, instead of UPS spelling. Thus, the game can facilitate a smooth transition between UPS spelling and traditional spelling.

While much of the UPS can be implemented and interacted with using computing devices, the UPS can be leveraged for off-line learning as well. The UPS can be used to create print materials, including print materials tailored to a given learner (e.g., based on the learning vocabulary module). In an example, the UPS can be used to create worksheets for a classroom, a children's novel that can be printed and distributed, flashcards that can be used for practice at home, and even posters and signage, among others.

Certain aspects and features of the present disclosure have been tested with a cohort of students and teachers. When compared with control data, students learning with the UPS showed a 370% faster progress, dramatically improving letter sound awareness. Students' error rate for letter-sound matching was also reduced by 56%, and over half of the students improved by one full quartile on this measure.

Students learning with UPS were also assessed for phonemic awareness and early decoding skills using the phonemic segmentation and non-word reading fluency sections of the Dynamic Indicators of Basic Early Literacy Skills (DIBELS) framework. After six weeks, the student average increased from the $23^{rd}$ to the $55^{th}$ percentile in phonemic awareness and from the $51^{st}$ to the $68^{th}$ percentile in early decoding skills.

Overall, students learning with UPS exhibited substantial improvements over control data regardless of age, native language, and delivery type (e.g., remote versus in-person).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram depicting an environment 100 for using an unambiguous phonics system (UPS) according to certain aspects of the present disclosure. A user can use a user device 102 to access aspects and features of the UPS. For example, the user device 102 can be used to perform translations into the UPS alphabet, display UPS characters, practice reading skills using text in the UPS alphabet, calculate complexity scores for text, and the like. The user device 102 can be a smartphone, a tablet, a desktop computer, a laptop computer, or any other suitable computing device.

In some cases, functions of the UPS can be performed entirely on the user device 102. For example, translation functionality may be performed entirely on the user device 102. In such cases, user device 102 may access database store 104, which may contain one or more databases used to implement features of the UPS. For example, database store 104 may contain a UPS dictionary of UPS spellings for various words. In another example, database store 104 may contain a database of phonetic spellings for various words. In another example, database store 104 may contain a database of UPS graphemes and their associated grapheme-phoneme combinations. In another example, database store 104 may contain progress tracking information (e.g., a current level of the user or a current list of known/mastered grapheme-phoneme combinations).

In some cases, to perform certain functions of the UPS, user device 102 can connect to a server 110, such as via a network 106. Network 106 can be any suitable network, such as a local area network (LAN), a wide area network (WAN), a cloud, or the Internet. Sever 110 can be implemented by one or more computing devices at a single location or across numerous locations.

Server 110 can perform certain functions of the UPS, such as providing a translated text in response to receiving an input text, providing a phonetic spelling of a word in response to receiving a given word, and/or other functions. Server 110 can be coupled to a database store 112, which can contain one or more databases used to implement features of the UPS. For example, database store 112 may contain a UPS dictionary of UPS spellings for various words. In another example, database store 112 may contain a database of phonetic spellings for various words. In another example, database store 112 may contain a database of UPS graphemes and their associated grapheme-phoneme combinations. In another example, database store 104 may contain progress tracking information (e.g., a current level of the user or a current list of known/mastered grapheme-phoneme combinations).

In some cases, server 110 can host a website and/or a web application implementing one or more of the features of the UPS, such as a translation service, a UPS dictionary, and/or a gaming environment for teaching reading and the UPS alphabet.

In some cases, an additional computing device 108 can be coupled to user device 102 via a network 106. The additional computing device 108 can be any suitable computing device, such as a smartphone, tablet, laptop computer, desktop computer, and the like. Additional computing device 108 can be coupled to a database store 114, which can contain one or more databases used to implement features of the UPS. For example, database store 114 may contain a UPS dictionary of UPS spellings for various words. In another example, database store 114 may contain a database of phonetic spellings for various words. In another example, database store 114 may contain a database of UPS graphemes and their associated grapheme-phoneme combinations. In another example, database store 104 may contain progress tracking information (e.g., a current level of the user or a current list of known/mastered grapheme-phoneme combinations).

In some cases, additional computing device 108 can be used to control some aspect of the user device's 102 engagement with the UPS. For example, additional computing device 108 can be a computer used by a teacher or instructor. The teacher may be able to interact with a user using the user device 102. The teacher may be able to use the additional computing device 108 to provide feedback (e.g., correct or incorrect pronunciation) as the user engages in a training exercise on the user device 102. In some cases, the teacher can use the additional computer device 108 to update settings on the user device 102, such as to identify certain words or grapheme-phoneme combinations on which the user should focus attention during training exercises.

In some cases, aspects of the UPS can be non-digital and/or non-computer-based. In some cases, the UPS alphabet can be used on flashcards 116, in a book 118, or in another form of media 120. While flashcards 116, books 118, and other media 120 can be static in nature, in some cases, they can be dynamically generated based on a user's current level of progression (e.g., the user's known and/or mastered words and/or grapheme-phoneme combinations). For example, on demand, a user can use the user device 102 (or a teacher can use the additional computing device 108) to generate (e.g., print out) a set of flashcards 116, a book 118, or other media 120. To do so, the user device 102 can access features of the UPS to identify certain words and/or grapheme-phoneme combinations that may be useful and generate the set of flashcards 116, the book, or the other media 120 based on those identified words and/or grapheme-phoneme combinations.

While depicted with a particular collection of elements, in some cases environment 100 can include more or fewer elements, and in other orders.

FIG. 2 is a diagram depicting several example words written in UPS spelling according to certain aspects of the present disclosure. Each unique UPS grapheme in a UPS alphabet can be associated with a particular grapheme-phoneme pair in the underlying alphabet (e.g., English). Thus, each unique UPS grapheme represents a specific phoneme to be expressed. While the term "phoneme" is traditionally used to represent a distinct unit of sound, as used herein, the term "phoneme" is inclusive of a lack of sound associated with a silent letter. As such, some UPS graphemes associated with silent letters can be said to represent a silent phoneme. For example, as seen in UPS spelling examples 202, 204, 206, 208, 210, and 212 each example contains a word having a silent letter. These silent letters are denoted as silent by the "x" diacritical mark below the silent letter (e.g., the "d" in the words "judge" and "bridge"). Silent letters can be indicated in other fashions, such as using other marks or notations, changing the weight of a grapheme (e.g., a lighter line weight used to represent the grapheme), or highlighting the grapheme.

A single traditional grapheme may be associated with multiple phonemes. In some cases, a UPS alphabet can be constructed such that all UPS graphemes associated with a particular traditional grapheme share visual similarities with the traditional grapheme. For example, those UPS graphemes can be based on the traditional grapheme, with extra notation marks (e.g., diacritical marks) for different grapheme-phoneme combinations of that traditional grapheme.

For example, in UPS spelling example 202, the words "quick" and "unique" both include a letter "q," but the letter "q" is pronounced differently in each word. Thus, using UPS spelling, the grapheme representing "q" in the word "quick" may look similar to a traditional "q," whereas the grapheme representing "q" in the word "unique" includes the added diacritical mark.

In UPS spelling example 204, the "j" in the words "judge" and "navajo" are also pronounced differently. In the word "judge," the "j" has a particular phoneme (e.g., /j/), but in the word "navajo," the "j" is silent (e.g., //). Thus, using UPS spelling, the grapheme representing the letter "j" in "judge" may look similar to a traditional "j," but in "navajo," it is indicated as being silent by the added diacritical mark. The "d" in UPS spelling example 206 is similar.

In some cases, UPS graphemes can be constructed to have an appearance similar to a traditional letter, but created in a fashion that permits for better differentiation between similar-looking letters. For example, as seen in UPS spelling example 202, the "q-shaped" graphemes are created with a distinct hook, permitting the letter to be better differentiated from similar-looking letters, such as "p," "d" and "b."

Multiple traditional graphemes can sometimes be used to create the same phoneme. In some cases, UPS spelling makes use of similar notation marks (e.g., diacritical marks) for different graphemes associated with the same phoneme. In other words, two UPS graphemes with the same notation mark may be pronounced the same (e.g., have the same phoneme), but may originate from different traditional graphemes.

For example, UPS spelling example 208 shows the UPS spellings of the words "alien" and "happy." In "alien," the letter "i" makes a phoneme /iy/. In "happy," the letter "y" makes the same phoneme, /iy/. In UPS spelling example 208, the UPS graphemes for both the "i" in "alien" and the "y" in "happy" share the same type of diacritical mark. Thus, a learner may be able to easily know that despite being different letters, the two letters make similar or the same phonemes.

This principle is seen in UPS spelling example 210 with the "a" in "all" and the "o" in "dog" both making the /ao/ phoneme, and thus their corresponding UPS graphemes each include the same type of diacritical mark. In UPS spelling example 210, the "o" in "lion," the "a" in "agree," and the "e" in "jacket" all make the same /ah/ phoneme, and thus their corresponding UPS graphemes each include the same type of diacritical mark.

While this type of phoneme-consistent marking may be useful in some cases, it need not always occur. While certain designs for UPS graphemes are depicted in FIG. 2, other suitable designs can be used instead.

Figure 3:
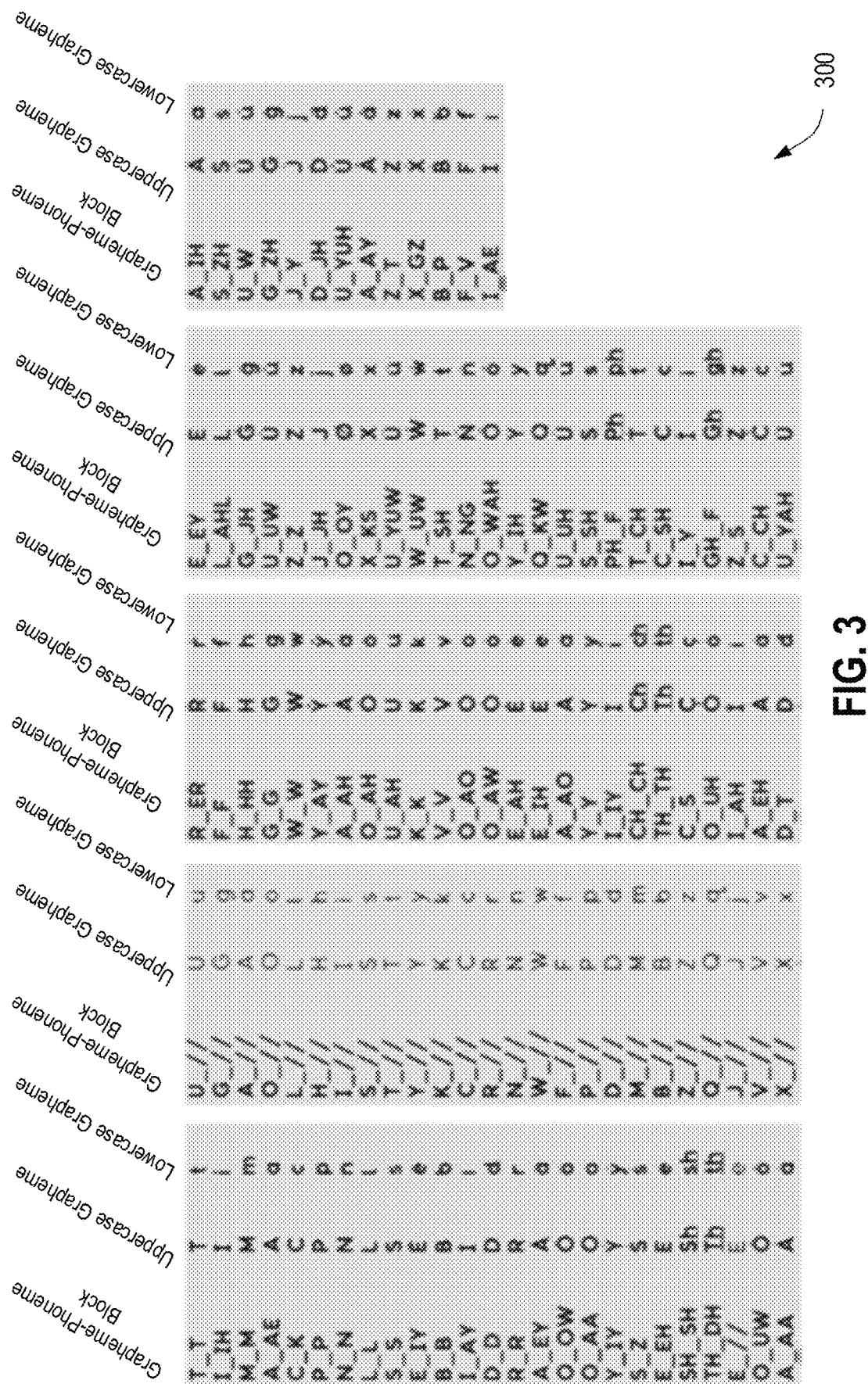
FIG. 3 is a chart depicting a set of example uppercase and lowercase UPS graphemes mapped to corresponding grapheme-phoneme combinations according to certain aspects of the present disclosure.

FIG. 3 is a chart 300 depicting a set of example uppercase and lowercase UPS graphemes mapped to corresponding grapheme-phoneme combinations according to certain aspects of the present disclosure.

The "Grapheme-Phoneme Block" column includes a list of various combinations of traditional graphemes expressed as phonemes. Each of these grapheme-phoneme combinations is represented by corresponding uppercase and lowercase UPS graphemes, as indicated by the "Uppercase Grapheme" and "Lowercase Grapheme" columns, respectively.

As seen in chart 300, certain grapheme-phoneme combinations are represented by UPS graphemes that are identical to the traditional grapheme, whereas other grapheme-phoneme combinations are represented by UPS graphemes that share visual similarities with the traditional grapheme, but also include additional notation marks. Silent letters are denoted by the "_/" indication in the Grapheme-Phoneme Block column, and are represented as being silent in the UPS alphabet by a thinner font weight. In other cases, silent letters can be represented as being silent in the UPS alphabet in other ways, such as through the use of diacritical marks or other notations.

While certain designs for UPS graphemes are depicted in chart 300, other suitable designs can be used instead.

Figure 4:
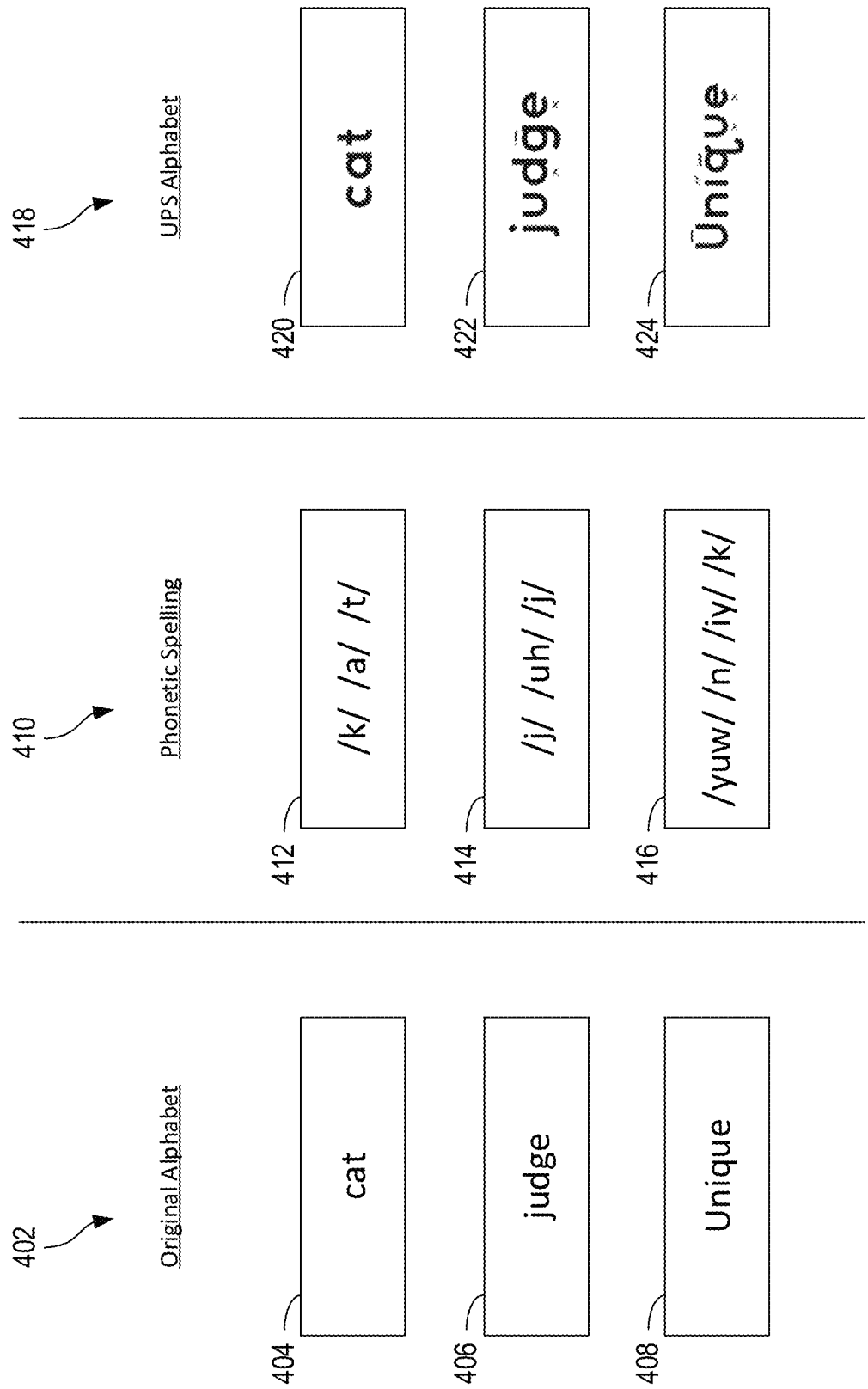
FIG. 4 is a diagram depicting a set of words presented in an original alphabet, as a phonetic spelling, and in the UPS alphabet according to certain aspects of the present disclosure.

FIG. 4 is a diagram depicting a set of words presented in an original alphabet, as a phonetic spelling, and in the UPS alphabet according to certain aspects of the present disclosure. The UPS translates words from an original alphabet domain 402 (e.g., traditional alphabet domain) into a UPS alphabet domain 418 using the phonetic spelling 410 of the given words. As depicted in FIG. 4, the blocks of the original alphabet domain 402 denote the traditional graphemes used to create each word; the blocks of the phonetic spelling 410 denote the phonemes used to create each word; and the blocks of the UPS Alphabet domain 418 denote the UPS graphemes that correspond to the grapheme-phoneme combination for each word.

Block 404 shows the traditional graphemes used to create the word "cat." Block 412 shows the phonemes used to create the word "cat." By combining the graphemes from block 404 and the phonemes of block 412, grapheme-phoneme combinations can be created for each of the letters of the word "cat." Mapping these grapheme-phoneme combinations to the corresponding UPS graphemes gives the UPS spelling of the word "cat" at block 422. The UPS representation of "cat" at block 420 can be identical to or similar to the original alphabet representation of "cat" at block 404 because the grapheme-phoneme combinations used to create the word are relatively common.

Block 406 shows the traditional graphemes used to create the word "judge." Block 414 shows the phonemes used to create the word "judge." By combining the graphemes from block 406 and the phonemes of block 414, grapheme-phoneme combinations can be created for each of the letters of the word "judge." Mapping these grapheme-phoneme combinations to the corresponding UPS graphemes gives the UPS spelling of the word "judge" at block 422. It will be noted that the "d" and the "e" in the UPS spelling of the word "judge" at block 422 include "x" notation marks below the letter, indicating that the letters are silent.

Block 408 shows the traditional graphemes used to create the word "Unique." Block 416 shows the phonemes used to create the word "Unique." By combining the graphemes from block 408 and the phonemes of block 416, grapheme-phoneme combinations can be created for each of the letters of the word "Unique." Mapping these grapheme-phoneme combinations to the corresponding UPS graphemes gives the UPS spelling of the word "Unique" at block 424.

Figure 5:
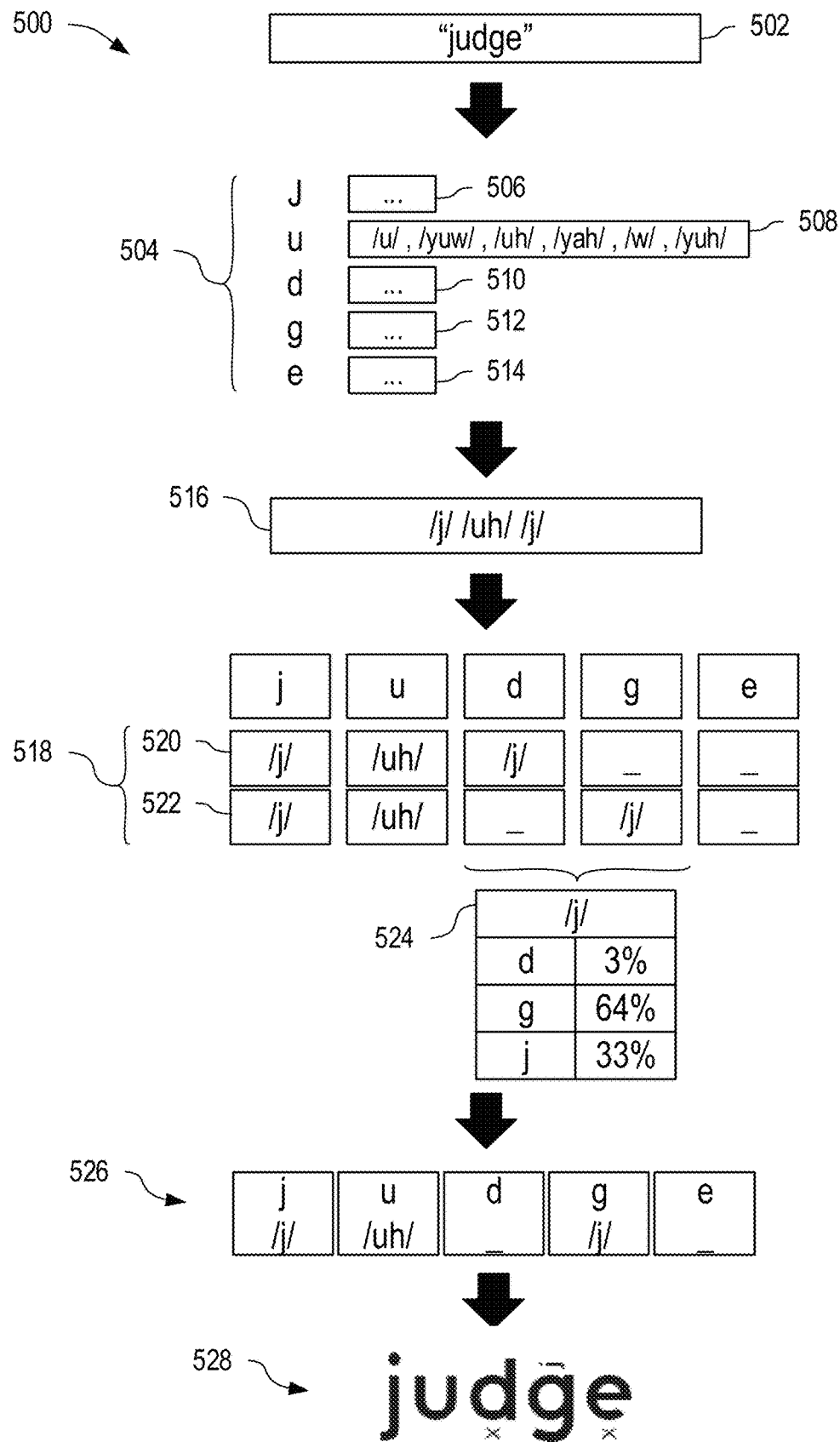
FIG. 5 is a diagram depicting an example translation from an original alphabet to a UPS alphabet according to certain aspects of the present disclosure.

FIG. 5 is a diagram depicting an example translation 500 from an original alphabet to a UPS alphabet according to certain aspects of the present disclosure. Example translation is shown as being performed on the word 502 "Judge." Word 502 shows the traditional graphemes used to create the word "judge."

The word "judge" can then be separated into individual graphemes and a set of allowable matches 504 can be generated. The set of allowable matches 504 can include, for each of the graphemes of the word, a bucket 506, 508, 510, 512, 514 of phonemes known to be associated with the given grapheme. For illustrative purposes, only bucket 508 is depicted in full. In bucket 508, the traditional grapheme "u" is identified as having the identified phonemes as allowable matches.

A phonetic spelling 516 for the word 502 can also be obtained. The phonetic spelling 516 can be retrieved from a database, can be input by a user, or can be otherwise determined. Here, the phonetic spelling 516 indicates that the word 502 "judge" has three phonemes: /j/ /uh/ /j/.

A set of valid spellings 518 (e.g., valid grapheme-phoneme spellings) can be generated using the phonetic spelling 516 and the traditional graphemes from the word 502. In some cases, the set of valid spellings 518 includes only a single spelling, in which case that spelling can be automatically selected. Generating the set of valid spellings 518 can include matching the phonemes of the phonetic spelling 516 with the set of allowable matches 504. For example, if the first letter of the word does not contain any allowable matches to the first phoneme of the phonetic spelling, the first letter of the word might be assumed to be a silent letter. All potential combinations of graphemes and phonemes can be calculated, with valid spellings occurring only when the potential combination of grapheme and phoneme is present in the set of allowable matches 504.

In some cases, the set of valid spellings 518 can include a first valid spelling 520 and a second valid spelling 522. Each of the valid spellings 518, 520 can include valid grapheme-phoneme combinations that accurately represent the word 502. Here, the first valid spelling 520 attributes the final voiced phoneme to the "d" of "judge," with the "g" and "e" silent, whereas the second valid spelling 520 attributes that phoneme to the "g," with the "d" and "e" silent. Since either spelling can be valid, a determination must be made regarding which spelling to use.

In some cases, the user can be presented with the set of valid spellings 518 and given an option to simply select the desired spelling. In some cases, one of the spellings (e.g., the first valid spelling 520) can always be used.

However, in some cases, the system can intelligently select the spelling with the least complexity. To do so, the system determines which grapheme-phoneme combinations (or simply which phonemes) are in question. Here, the phoneme /j/ is in question as possibly being attributed to either "d" or "g." The system can access a database containing complexity information 524 associated with the grapheme-phoneme combinations D_J and G_J. In some cases, this complexity information is in the form of data indicating the frequency with which the various traditional graphemes represent the given phoneme. Here, the phoneme /j/ is represented by "d" 3% of the time, by "g" 64% of the time, and by "j" 33% of the time. Therefore, the system can select the second valid spelling 522 as the spelling to use, since it involves attributing the phoneme /j/ to the grapheme with which it is more often used.

The set of grapheme-phoneme combinations 526 can be established for the word 502, and those grapheme-phoneme combinations 526 can be mapped to the corresponding UPS graphemes to generate the UPS spelling 528.

In some cases, certain words may not have any valid spellings because the set of allowable matches does not contain sufficient grapheme-phoneme combinations to fit with the phonetic spelling of the word. In such cases, the system can analyze such failed words to identify new potential allowable matches that would improve its success rate. For example, the word "Navajo" contains a "J" making an /h/ sound. If this combination was not included in the initial set of allowable matches, it can be added after the word is identified as a failed word. Then, the translation can continue the process until the translating algorithm achieves a user-desired success rate (e.g., 97%). This step can be accomplished by storing the history of failed matches where no valid spellings were identified, and selecting the most frequently attempted failed match among these words as a new allowable match.

In some cases, aspects of the translation 500 can occur in different orders, and with fewer or additional aspects.

Figure 6:
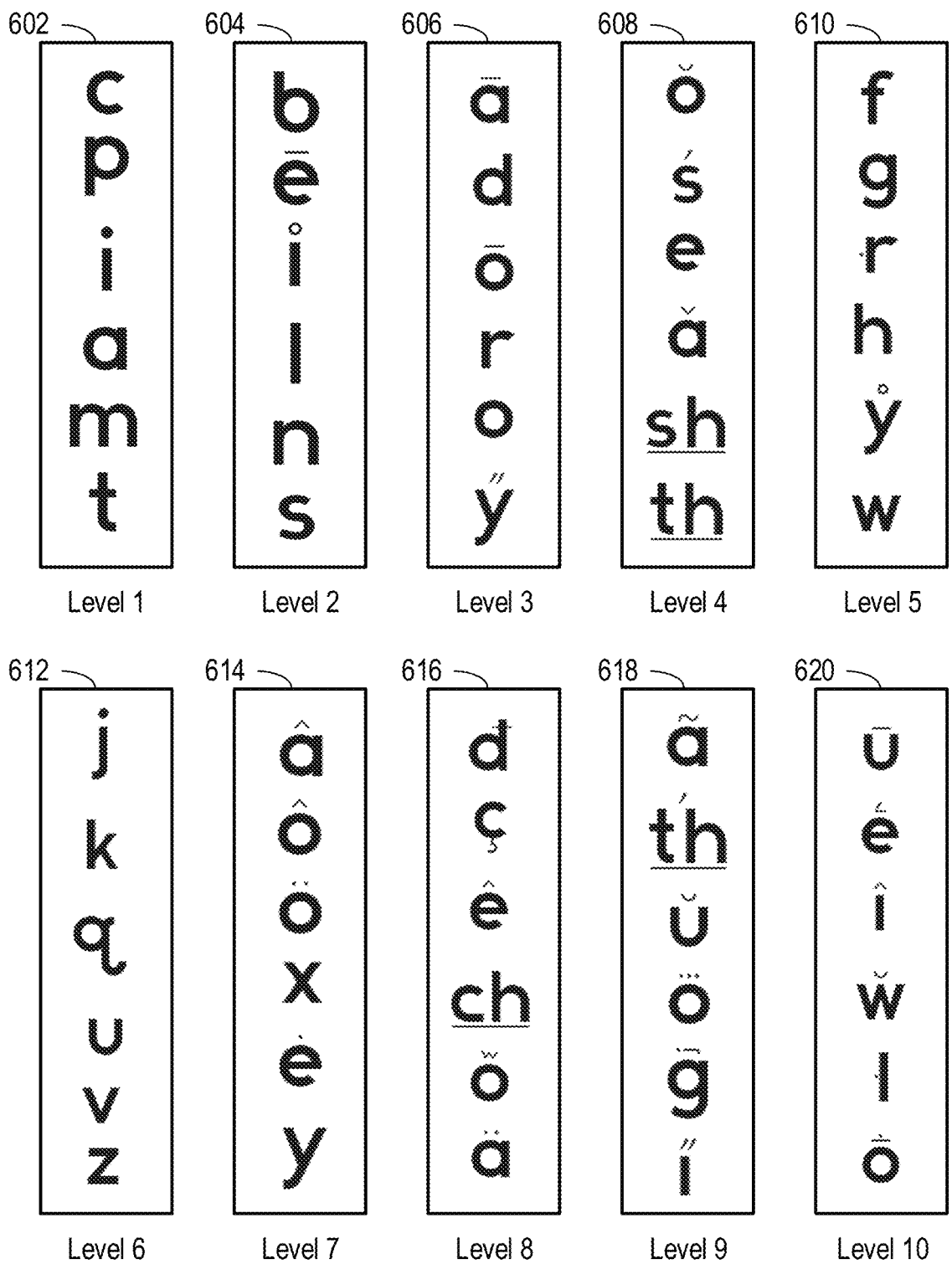
FIG. 6 is a diagram depicting a collection of UPS graphemes segmented into ten levels according to certain aspects of the present disclosure.

FIG. 6 is a diagram depicting a collection of UPS graphemes segmented into ten levels 602, 604, 606, 608, 610, 612, 614, 616, 618, 620 according to certain aspects of the present disclosure. Each of the UPS graphemes depicted in FIG. 6 represents a unique grapheme-phoneme combination in the traditional alphabet. The UPS graphemes can be segmented into the various levels 602, 604, 606, 608, 610, 612, 614, 616, 618, 620 based on frequency of use (e.g., complexity).

For example, the graphemes in Level 1 602 may be very commonly used grapheme-phoneme combinations, and thus can be attributed to the lowest level. By contrast, the graphemes in level 10 620 may be much more rarely used grapheme-phoneme combinations, and thus can be attributed to the highest level, although additional levels can be used.

An individual learning to read and/or learning the UPS alphabet can begin at Level 1 602, learning only the UPS graphemes present in that level and only words that can be created using those UPS graphemes. After mastering the UPS graphemes of Level 1 602, such as after showing sufficient proficiency (e.g., achieving a passing score on test), the individual can progress to Level 2 604. At Level 2 604, the individual can learn the UPS graphemes present in both Level 2 604 and Level 1 602, as well as words created using those UPS graphemes. The process can continue sequentially, with the individual sequentially progressing to a subsequent level and adding a new set of UPS graphemes to the set of graphemes available for learning and word choice. The process can continue until the individual is able to make use of all UPS graphemes and/or has reached the highest level.

The segmentation of UPS graphemes into the given levels 602, 604, 606, 608, 610, 612, 614, 616, 618, 620 is provided as an example, although other segmentations can be used and more or fewer levels can be used. Additionally, basing grapheme-phoneme combination frequency on different corpora can result in different grapheme-phoneme combinations having higher or lower frequency, which can result in certain UPS graphemes being moved to different levels.

Figure 7:
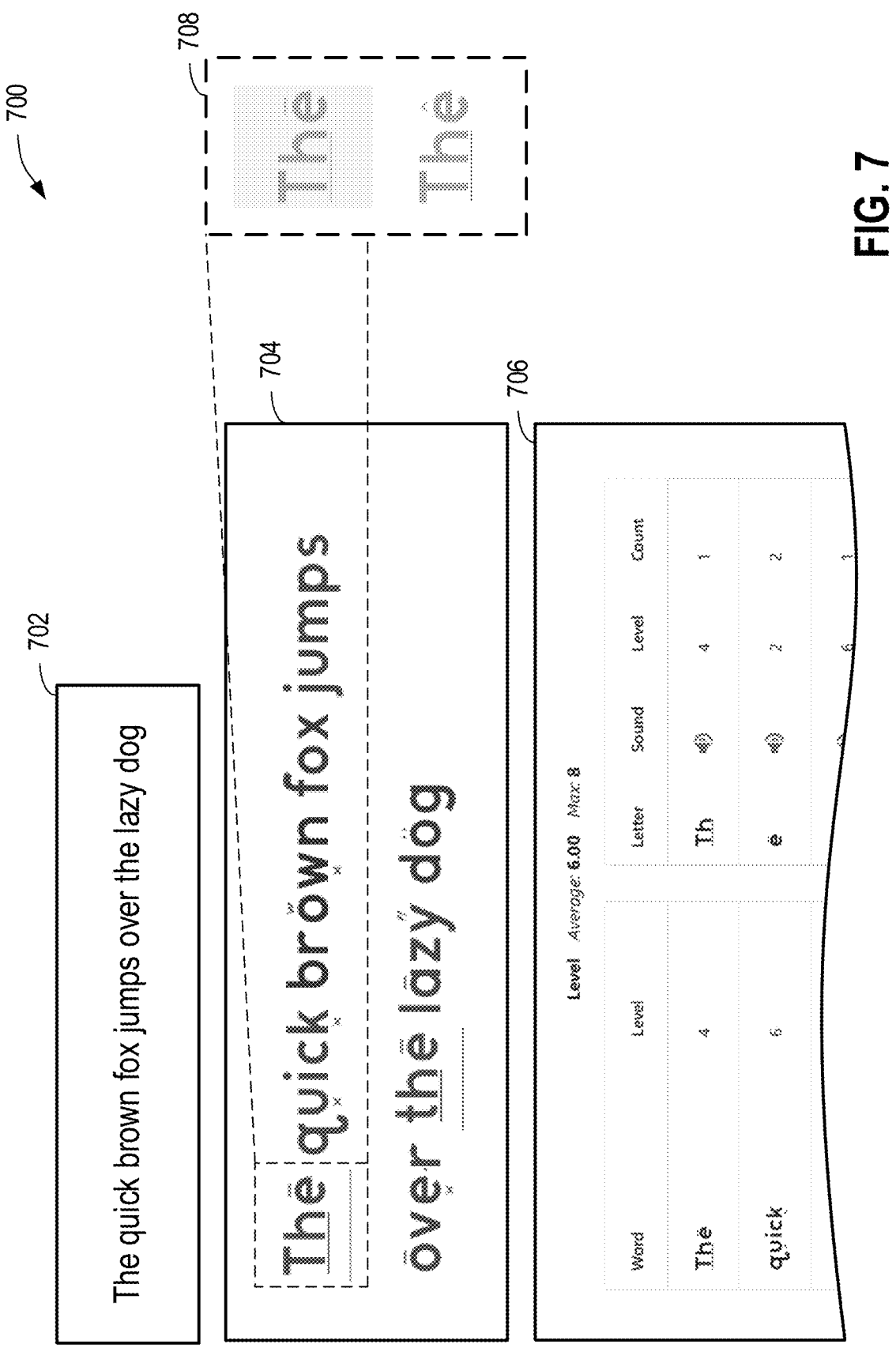
FIG. 7 is a diagram depicting an example of a UPS translation interface according to certain aspects of the present disclosure.

FIG. 7 is a diagram depicting an example of a UPS translation interface 700 according to certain aspects of the present disclosure. The interface 700 can be implemented in any suitable device or application, such as a web application.

The interface 700 can include an input box 702 into which input text can be provided in the original alphabet (e.g., traditional alphabet). As the user types, as the user completes words, or when the user issues a command (e.g., presses a button), the system can generate the UPS translation and present it in output box 704.

In some cases, when a particular word has multiple phonetic variations, an indicator can be provided, such as an underline below the word with multiple phonetic variations, as seen with the "the" words in the output 704 (e.g., output box or region). Upon hovering or clicking the word having the multiple phonetic variations, a pop-up selector 708 can be presented, giving the user the option to select one of the other phonetic variations. The pop-up selector 708 can appear directly over the word in the output 704 (depicted off to the side in FIG. 7 for illustrative purposes). In other cases, the phonetic variation notification and selection can occur in other fashions.

The interface 700 can also include supplemental information 706 (e.g., in a supplemental information box or region). The supplemental information 706 can include information about the complexity of the input text and/or information about the pronunciation of the input text. As depicted in FIG. 7, the supplemental information 706 includes a calculated complexity level showing an average of 6.00 and a maximum of 8. These complexity levels represent the average complexity and highest complexity of the words and/or grapheme-phoneme combinations in the input text. The supplemental information 706 can also include information about each word of the input text, such as the complexity level of each individual word (e.g., the word "quick" has a complexity of 6). In some cases, the supplemental information 706 can include information about each grapheme-phoneme combination in the input text, such as a link to a recording of the pronunciation, an indication of the complexity level of the grapheme-phoneme combination, and a count of the number of times the grapheme-phoneme combination appeared in the input text.

Figure 8:
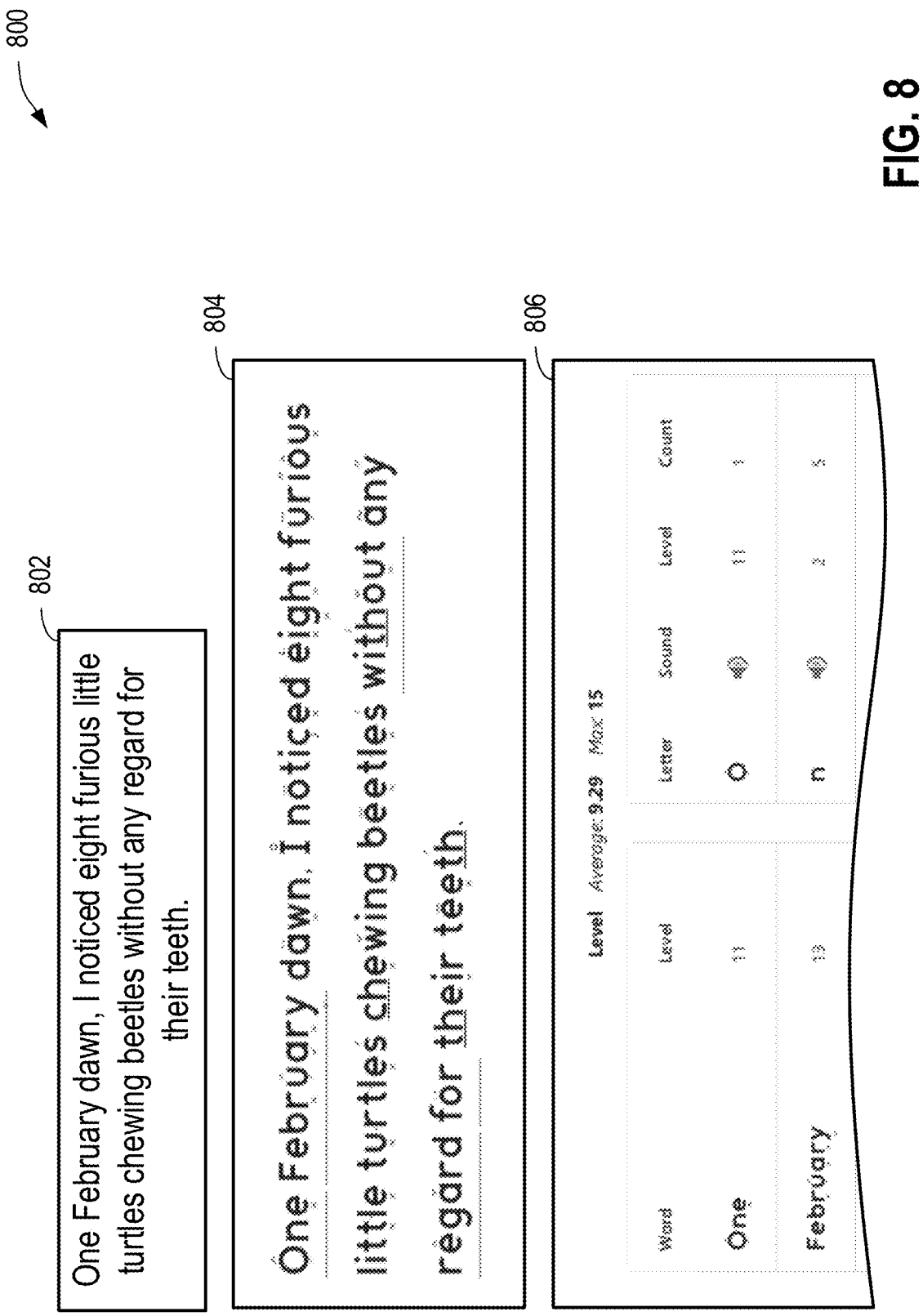
FIG. 8 is a diagram depicting another example of a UPS translation interface according to certain aspects of the present disclosure.

FIG. 8 is a diagram depicting another example of a UPS translation interface 800 according to certain aspects of the present disclosure. Interface 800 can be the same as interface 700, but with alternate input text in the input box 802. When different input text is provided in the input box 802, the output 804 can be updated with the UPS translation of the input text, and the supplemental information 806 can be updated with information associated with the new input text.

As depicted in FIG. 8, due to the relative rareness of the words and/or grapheme-phoneme combinations used in the input text, the average complexity score for the input text is 9.29 and the maximum complexity score is 15. This complexity information can be useful to determine how one must edit the input text to achieve a desired complexity level. For example, the word "furious" is given a complexity level of 15, due to the presence of the U_YUH grapheme-phoneme combination. If one wanted to make the passage easier to read for individuals at lower levels, one could replace the word "furious" with an alternate word. In some cases, the interface 800 can provide recommendations for replacement words. In some cases, the interface 800 can automatically highlight words having a complexity level above a threshold (e.g., a preset threshold, a threshold based on the user's reading level, or a user-provided threshold).

Figure 9:
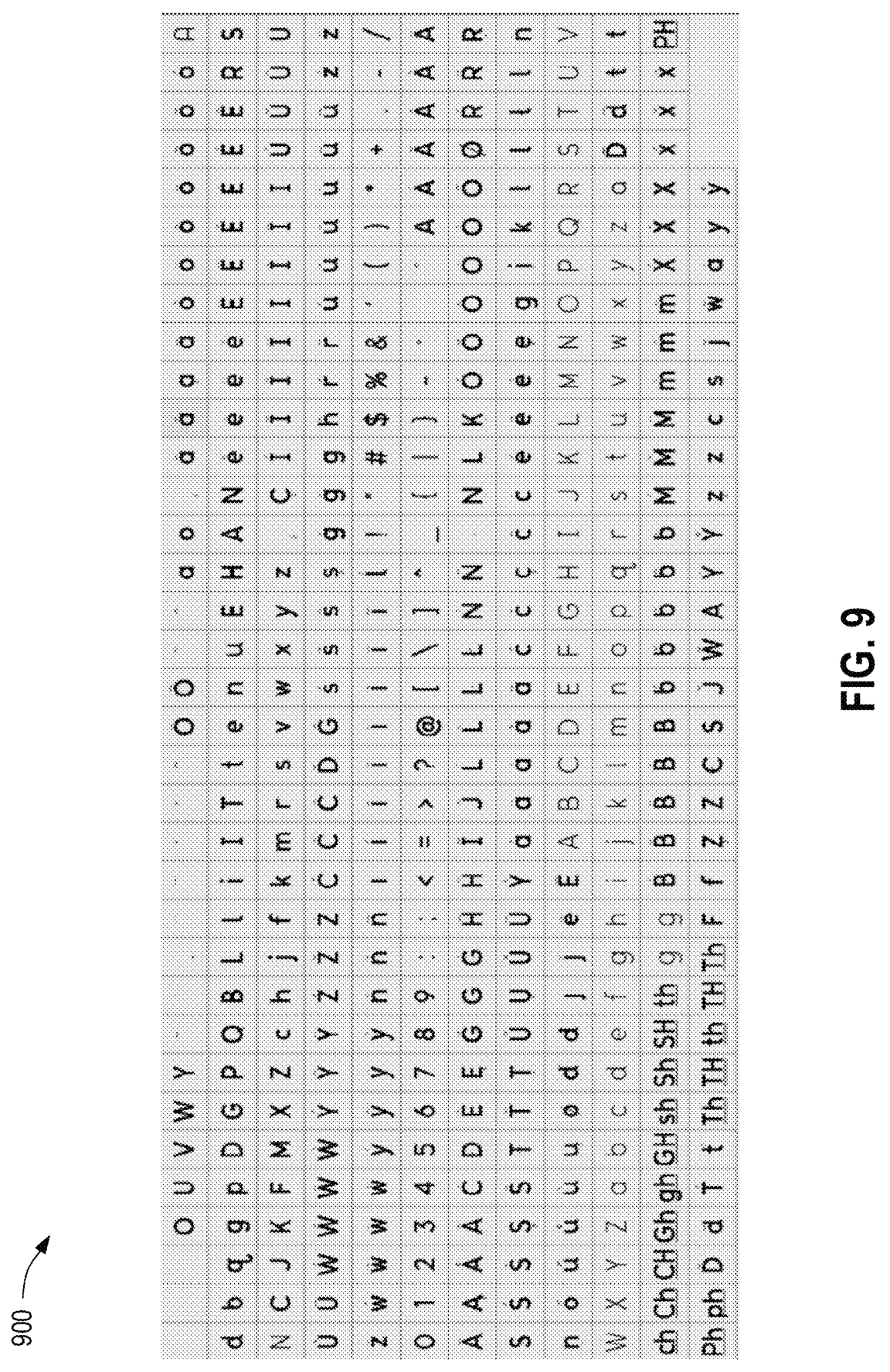

FIG. 9 is a chart 900 depicting a set of example UPS graphemes according to certain aspects of the present disclosure. By providing an extended alphabet, the UPS alphabet can be sure to have sufficient graphemes to cover every possible grapheme-phoneme combination of the traditional alphabet. In some cases, the UPS alphabet can include more or fewer graphemes. In some cases, the UPS alphabet may be based on a different alphabet other than the English or Latin alphabet.

While certain designs for UPS graphemes are depicted in chart 900, other suitable designs can be used instead.

Figure 10:
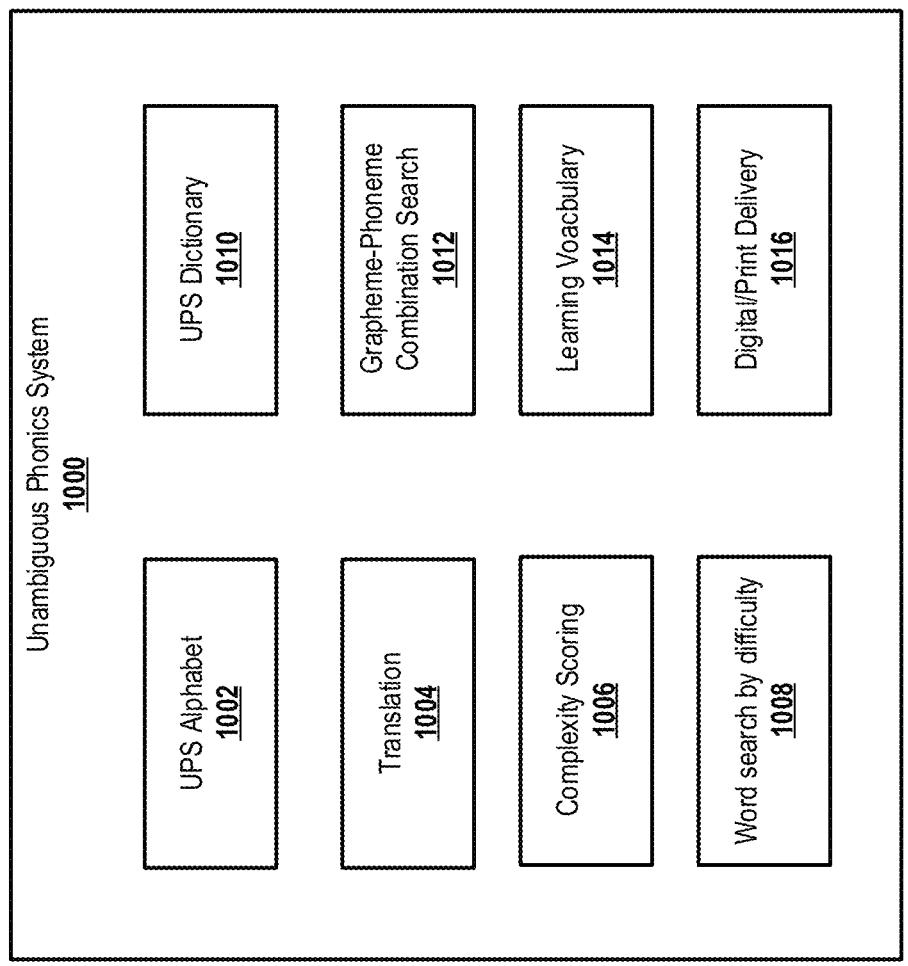
FIG. 10 is a schematic diagram of an unambiguous phonics system and example modules thereof according to certain aspects of the present disclosure.

FIG. 10 is a schematic diagram of an unambiguous phonics system 1000 and example modules thereof according to certain aspects of the present disclosure. Unambiguous phonics system (UPS) 1000 can be implemented by one or more computing devices across one or more locations. The UPS 1000 can include various modules to facilitate performing the various features disclosed herein.

A UPS Alphabet module 1002 can include information necessary to generate, display, and otherwise output the UPS graphemes. The UPS Alphabet module 1002 can also house a database mapping every unique grapheme-phoneme combination of the traditional alphabet to a unique UPS grapheme. In some cases, both a lowercase and uppercase UPS grapheme can be mapped to a given grapheme-phoneme combination, although that need not always be the case. In some cases, the UPS Alphabet module 1002 can also create a UPS alphabet from a traditional alphabet system, such as to create a UPS alphabet for a language other than English. The process to create a UPS alphabet can include identifying grapheme-phoneme combinations and assigning unique UPS graphemes to each of the grapheme-phoneme combinations. In some cases, this process can also make use of complexity scores to determine which UPS grapheme to use for which grapheme-phoneme combinations.

A translation module 1004 can process incoming input text and translate it into translated text (e.g., a UPS spelling or a representation using the UPS alphabet). The translation module 1004 can support automatic translation. The translation module 1004 can be used to create a UPS Spelling of the input text for various purposes, such as to generate printed materials containing the UPS spelling and optionally the traditional spelling.

A complexity scoring module 1006 can be used to determine the complexity of a grapheme-phoneme combination, a word, and/or an input text of any length. Determining complexity can involve analyzing a corpus of text in the traditional alphabet to identify the frequencies with which each grapheme-phoneme combination appears in the corpus. The higher the frequency, the lower the resultant complexity value. The complexity scoring module 1006 can be leveraged to assign a reading level to a given piece of text. The complexity scoring module 1006 can also be leveraged by other modules to provide real-time feedback regarding the complexity of input text.

A word search by difficulty module 1008 can be implemented. The word search by difficulty module 1008 can help identify available words given a particular level of difficulty. The level of difficulty can be denoted as a difficulty level (e.g., a difficulty level as ascertained by the complexity scoring module 1006) or can be denoted based on a selection of grapheme-phoneme combinations.

A UPS dictionary module 1010 can provide a searchable dictionary matching traditional spellings of words to their UPS spellings. The UPS dictionary module 1010 can be created and updated by the translation module 1004. Additionally, the UPS dictionary module 1010 can be leveraged by the translation module 1004 to quickly retrieve a UPS spelling for a word that is already in the UPS dictionary.

A grapheme-phoneme combination search module 1012 can be used to search for words containing a given grapheme-phoneme combination. The given grapheme-phoneme combination can be provided in block notation (e.g., "T_T") as a grapheme and phoneme (e.g., "T" and "/t/"), as a UPS grapheme (e.g., "T"), or otherwise. The grapheme-phoneme combination search module 1012 can leverage the UPS dictionary module 1010 to identify words in the dictionary that contain the given grapheme-phoneme combination. The grapheme-phoneme combination search module 1012 can also be leveraged by the word search by difficulty module 1008 to identify words containing grapheme-phoneme combinations associated with a given difficulty level.

A learning vocabulary module 1014 can track a user's progress in learning grapheme-phoneme combinations and/or words. The learning vocabulary module 1014 can automatically identify new grapheme-phoneme combinations and/or words for the user to learn based on the set of grapheme-phoneme combinations the user has mastered and/or based on the words the user has experienced. The learning vocabulary module 1014 can make use of the grapheme-phoneme combination search module 1012 to identify words that use the grapheme-phoneme combinations known by the user.

A digital/print delivery module 1016 can provide for the delivery of digital content and/or print (e.g., physical) content written in the UPS alphabet. The digital/print delivery module 1016 can leverage the UPS Alphabet 1002 to generate and output the UPS graphemes. The digital/print delivery module 1016 can leverage the learning vocabulary module 1014 to automatically generate digital and/or print materials based on the user's current level of knowledge, such as with words that practice known grapheme-phoneme combinations or teach new grapheme-phoneme combinations.

Other modules can be used, as well as fewer modules. While depicted as independent modules, each of the modules depicted in FIG. 10 can be implemented through multiple modules and any number of the modules can be implemented together as a single module.

Figure 11:
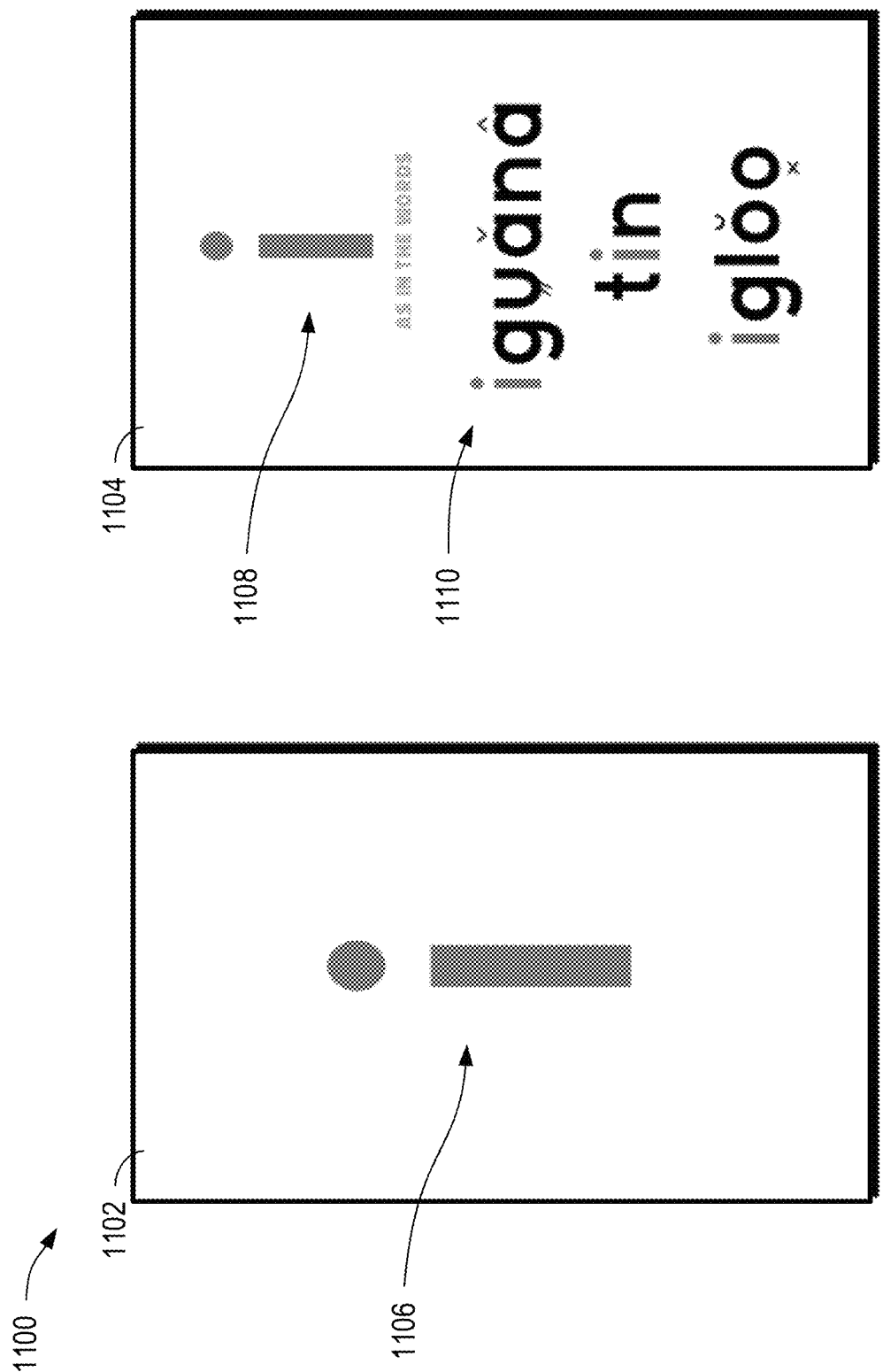
FIG. 11 is a diagram depicting example flash card according to certain aspects of the present disclosure.

FIG. 11 is a diagram depicting example flash card 1100 according to certain aspects of the present disclosure. The flash card 1100 can include front face 1102 and a rear face 1104. The front face 1102 can include a UPS grapheme 1106 to be learned by an individual. The rear face 1104 can include a copy of the UPS grapheme 1108, along with example words 1110 making use of the UPS grapheme 1108.

In some cases, the flash card 1100 can also include an indication of the grapheme-phoneme combination represented by the UPS Grapheme 1106, although that need not always be the case.

In some cases, flash card 1100 can be prepared in advance and sold in a set of flash cards. In other cases, flash card 1100 can be printed on-demand.

In some cases, example words 1110 can be selected to represent a mixture of low complexity and high complexity words. In some cases, example words 1110 can be selected to represent words known by the user or words the user has shown difficulty in learning.

In some cases, the level of difficulty (e.g., Level 1 or Level 2) for the flash card 1100 can be indicated on the flash card 1100, such as via a written notation (e.g., "Level 1" or "Level 2"), a color coding scheme (e.g., a first color for Level 1 and a second color for Level 2), or any other differentiable indication. In some cases, instead of or in addition to a level of difficulty indication for the flash card 1100 as a whole, a level of difficulty indication can be provided for one or more words of the example words 1110. For example, easy words may be printed in a first color and harder words may be printed in a second color. In another example, a gradient can be used to distinguish Levels.

In some cases, the flash card 1100 and/or the UPS grapheme 1106 can be associated with a level of difficulty. In such cases, example words 1110 may be selected to only include grapheme-phoneme combinations that are associated with the level of the card or a lower level.

While depicted as a flash card 1100, any suitable print media can be used to provide the UPS grapheme 1106 and example words 1110. Additionally, in some cases, flash card 1100 can be implemented digitally instead of in print.

FIG. 12 is a diagram 1200 depicting a collection of UPS graphemes segmented into fifteen levels according to certain aspects of the present disclosure. Each of the UPS graphemes depicted in FIG. 12 represents a unique grapheme-phoneme combination in the traditional alphabet. The UPS graphemes can be segmented into the various levels (e.g., levels 1 through 15) based on frequency of use (e.g., complexity).

For example, the graphemes in Level 1 may be very commonly used grapheme-phoneme combinations, and thus can be attributed to the lowest level. By contrast, the graphemes in Level 15 may be much more rarely used grapheme-phoneme combinations, and thus can be attributed to the highest level, although additional levels can be used.

The segmentation of UPS graphemes into the given levels is provided as an example, although other segmentations can be used and more or fewer levels can be used. Additionally, basing grapheme-phoneme combination frequency on different corpora can result in different grapheme-phoneme combinations having higher or lower frequency, which can result in certain UPS graphemes being moved to different levels.

While certain designs for UPS graphemes are depicted in diagram 1200, other suitable designs can be used instead.

Figure 13:
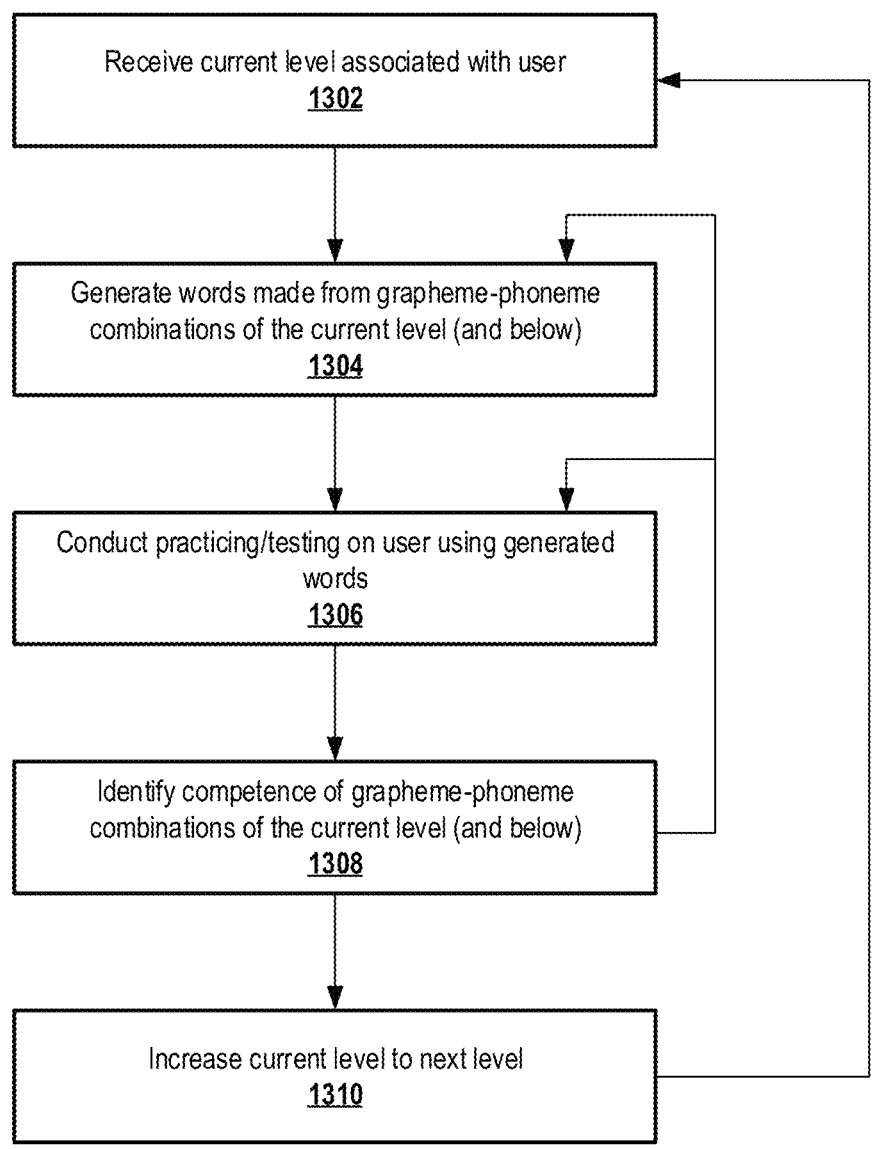
FIG. 13 is a flowchart depicting a process for level-based teaching according to certain aspects of the present disclosure.

FIG. 13 is a flowchart depicting a process 1300 for level-based teaching according to certain aspects of the present disclosure. At block 1302, a current level associated with a user is received. The current level can be stored in a database or provided by the user or a third part (e.g., parent or teacher). The current level can be associated with a given set of grapheme-phoneme combinations.

At block 1304, words can be generated using grapheme-phoneme combinations that are associated with the current level, as well as grapheme-phoneme combinations that are associated with previous (e.g., lower) levels. In some cases, the use of grapheme-phoneme combinations from the current level can be favored.

At block 1306, practicing and/or testing can be conducted on the user using the generated words from block 1304. Practicing and/or testing can include presenting the user with one or more of the generated words from block 1304.

At block 1308, competence of the grapheme-phoneme combinations from the current level can be identified for the user. Identifying competence can include testing the user, such as to determine a number of correct pronunciations for a given sample size. In some cases, competence can be identified by a user self-indicating competence. In some cases, competence can be identified by a third party indicating the user's competence. Indicating competence with a particular grapheme-phoneme combination can be considered having mastery of that combination.

If competence is not yet identified at block 1308, the user may need additional practice, in which case process 1300 can return to block 1304 or block 1306.

However, if competence is identified at block 1308, the user's current level may be increased to the next level (e.g., from level 1 to level 2) at block 1310. Once the user's current level has increased, the user will have access to one or more additional grapheme-phoneme combinations, and thus additional words. Process 1300 can optionally continue back at block 1302 (or block 1034), allowing the user to practice and/or be tested on the new grapheme-phoneme combinations afforded to their newly acquired level.

In some cases, process 1300 can be especially useful for virtual learning.

Figure 14:
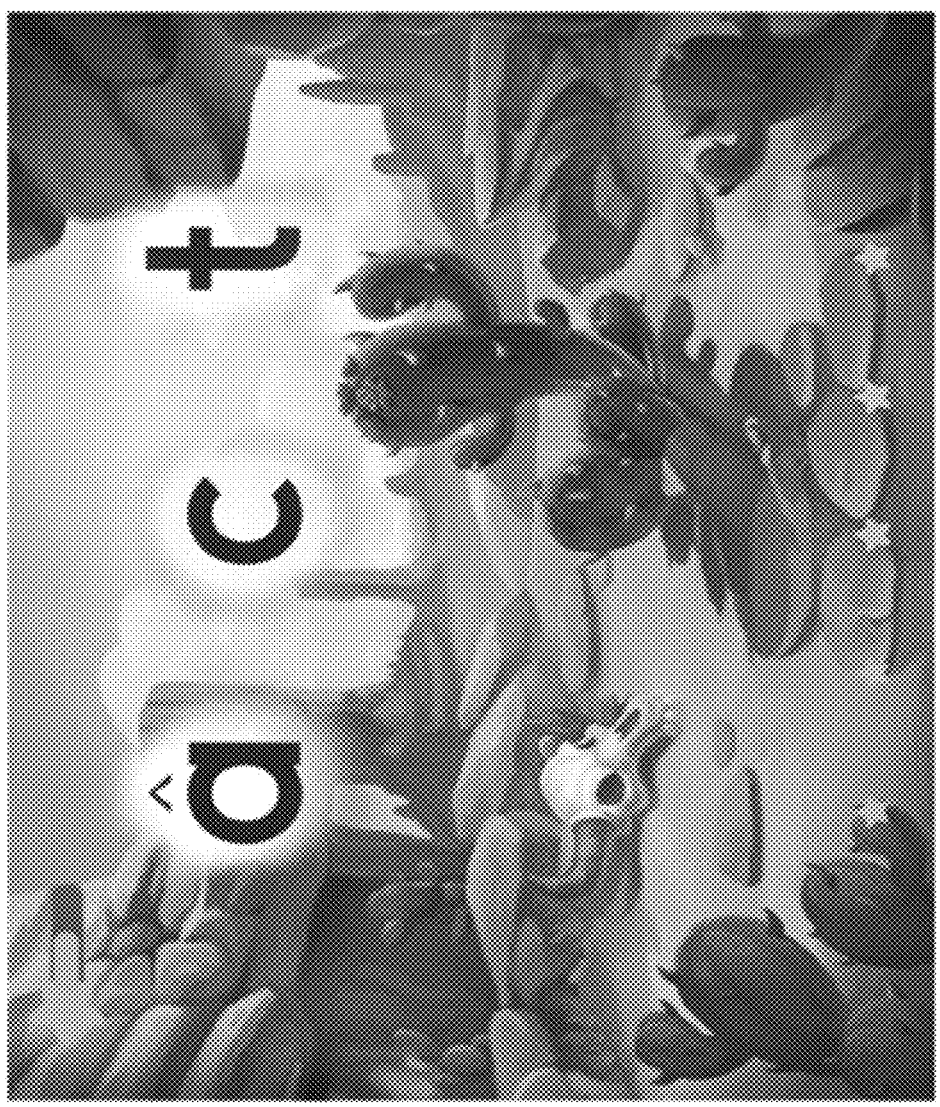
FIG. 14 is a diagram depicting an example of a graphical interface for a game teaching the UPS alphabet according to certain aspects of the present disclosure.

FIG. 14 is a diagram depicting an example of a graphical interface 1400 for a game teaching the UPS alphabet according to certain aspects of the present disclosure. The graphical interface 1400 is an example of a themed exercise for practicing grapheme-phoneme combinations. The graphical interface 1400 can include a background or other thematic elements, here depicted as a desert. The graphical interface 1400 can provide one or more UPS graphemes for the user to practice. In some cases, clicking on, tapping, or hovering over a UPS grapheme can initiate an audio recording of a correct pronunciation of the UPS grapheme. In some cases, instead of individual UPS graphemes, entire words written in UPS spelling can be provided. In some cases, additional graphics or images associated with the word provided can be presented alongside the word. For example, the word "cat" can be presented alongside an image of a cat.

Graphical interface 1400 is an example of an interface for a game teaching the UPS alphabet, although other interfaces can be used.

Figure 15:
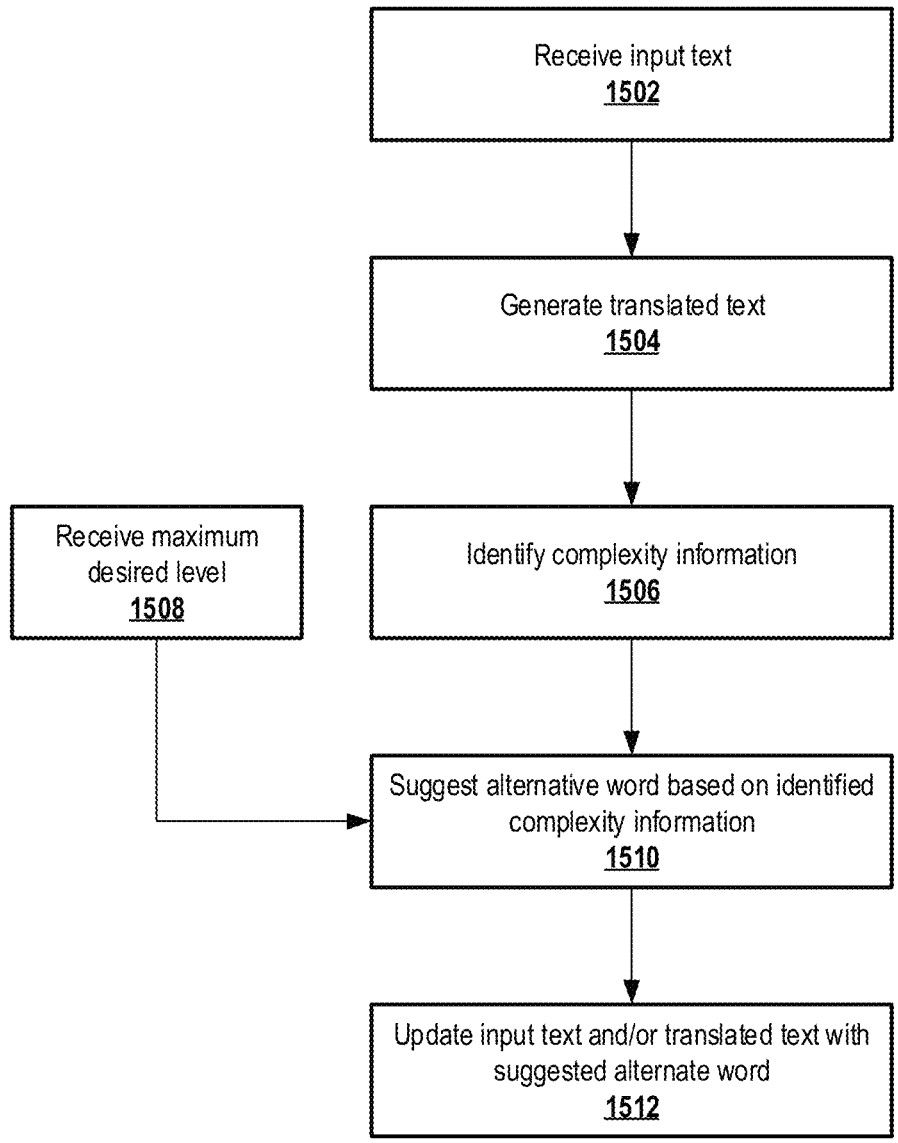
FIG. 15 is a flowchart depicting a process for dynamically determining complexity according to certain aspects of the present disclosure.

FIG. 15 is a flowchart depicting a process 1500 for dynamically determining complexity according to certain aspects of the present disclosure. At block 1502, input text is received. Input text can include any number of characters and/or words written in a traditional alphabet.

At optional block 1504, translated text is generated from the input text. The translated text is a UPS spelling of the input text. In some cases, dynamically determining complexity can occur without translating input text into UPS spelling.

At block 1506, complexity information can be identified for the input text. The complexity information can include information about a level of complexity, a level of difficulty, and/or a frequency of use in the English language (or specific corpus) for one or more grapheme-phoneme combinations and/or words of the input text. For example, identifying complexity information at block 1506 can include identifying and outputting a reading level for the input text (e.g., reading level 11). The complexity information can be based on the frequency of use in the English language (or in a specific corpus of text) of one or more of the grapheme-phoneme combinations and/or words of the input text. In some cases, displaying complexity information includes highlighting or otherwise indicating high-complexity words or grapheme-phoneme combinations. In some cases, displaying complexity information includes presenting complexity values for each of the words and/or each of the grapheme-phoneme combinations of the input text. In some cases, process 1500 ends upon identifying (and outputting, such as displaying) the complexity information.

In some cases, at block 1510, an alternative word can be suggested based on the identified complexity information. For example, at block 1510, the word(s) with the highest complexity level as identified at block 1506 can be highlighted and an alternative word can be suggested, such as an alternative word having a lower complexity score.

In some cases, at block 1508, a maximum desired complexity level can be received, such as from user input or from a database containing the user's current reading level. In such cases, an alternative word can be suggested at block 1510 for any words whose complexity exceeds the maximum desired complexity level from block 1508.

At block 1512, the input text and/or translated text can be updated with the suggested alternate word. In some cases, updating with the suggested alternate word can occur automatically as the user types or enters the input text. In some cases, however, updating with the suggested alternate word only occurs after the user provides confirmation to use the alternate word.

In some cases, process 1500 can include additional or fewer blocks, as well as blocks performed in any suitable order.

Figure 16:
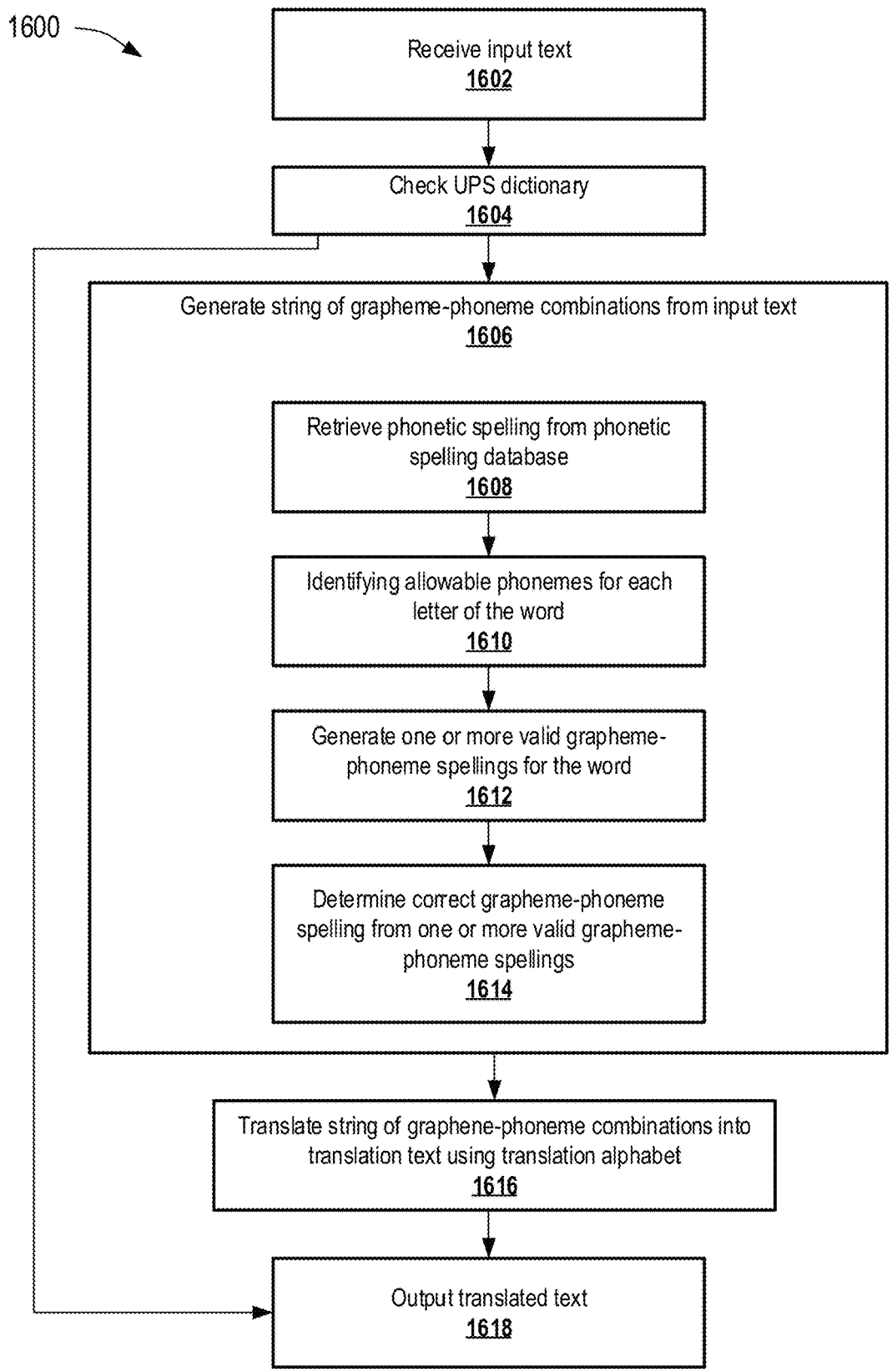
FIG. 16 is a flowchart depicting a process for translating input text into the UPS alphabet according to certain aspects of the present disclosure.

FIG. 16 is a flowchart depicting a process 1600 for translating input text into the UPS alphabet according to certain aspects of the present disclosure.

At block 1602, input text can be received. The input text can include a string of graphemes presented in an original alphabet (e.g., English). The string of graphemes is a set of graphemes that include one or more graphemes. In some cases, the string of graphemes can be a computer string (e.g., a string datatype), but that need not always be the case. In some cases, the string of graphemes can include a single character, including a single character within a word. For example, if a single letter in a longer word is desired to be translated to UPS spelling, the input text can be a string containing only that single letter. In some cases, the string of graphemes can be at least two or more letters long.

The input text can include a word or multiple words. At block 1604, the UPS dictionary can be checked to determine whether any of the input text is already present in the UPS dictionary. If any of the input text is already present in the UPS dictionary, the UPS spelling for that text can be retrieved from the UPS dictionary and output as translated text at block 1618.

Assuming the input text is not in the UPS dictionary, the process 1600 can continue by generating a string of grapheme-phoneme combinations from the input text at block 1606. To generate the string of grapheme-phoneme combinations from the input text, each word of the input text can be processed. A phonetic spelling can first be obtained for the word from a phonetic spelling database at block 1608. At block 1610, allowable phonemes for each letter of the word can be identified. These allowable phonemes represent each of the various phonemes that could be represented by a given letter (e.g., grapheme).

At block 1612, one or more valid grapheme-phoneme spellings for the word can be generated. Generating a valid grapheme-phoneme spelling for a word can include determining all combinations of letters of the word and phonemes of the phonetic spelling, then identifying which of those combinations includes a letter combined with a phoneme in that letter's set of allowable phonemes.

At block 1614, the correct grapheme-phoneme spelling is determined from the one or more valid grapheme-phoneme spellings from block 1612. If a single valid grapheme-phoneme spelling is identified at block 1612, that spelling can be used as the string of grapheme-phoneme combinations for block 1606.

If multiple valid grapheme-phoneme spellings are generated, one of the spellings must be selected. In some cases, the user can be presented with the set of valid grapheme-phoneme spellings and can be permitted an opportunity to select one of the valid grapheme-phoneme spellings. If selected, that valid grapheme-phoneme spelling can be used as the string of grapheme-phoneme combinations for block 1606.

In some cases, when multiple valid grapheme-phoneme spellings are identified, a database of frequency information (or complexity information) can be accessed. The frequency information can indicate the frequency with which certain grapheme-phoneme combinations occur in the original alphabet. One or more ambiguous phonemes can be identified across the valid grapheme-phoneme spellings. An ambiguous phoneme can be a phoneme that is associated with a different grapheme in multiple valid grapheme-phoneme spellings. The different grapheme-phoneme combinations for the ambiguous phoneme across the valid grapheme-phoneme spellings can be identified. These identified grapheme-phoneme combinations can be compared to the frequency information to determine which grapheme-phoneme combination has a higher frequency. The grapheme-phoneme spelling containing the grapheme-phoneme combination with the higher frequency can be selected over the grapheme-phoneme spelling that does not contain the grapheme-phoneme combination with the higher frequency. This process can be repeated as necessary until a single grapheme-phoneme spelling remains, which can be used as the string of grapheme phoneme combinations for block 1606.

At block 1616, the string of grapheme-phoneme combinations can be translated into translation text using a translation alphabet. The translation text is the UPS spelling of the input text. The translation alphabet is the UPS alphabet. At block 1618, the translation text can be output in any suitable fashion.

In some cases, process 1600 can include additional or fewer blocks, as well as blocks performed in any suitable order.

Figure 17:
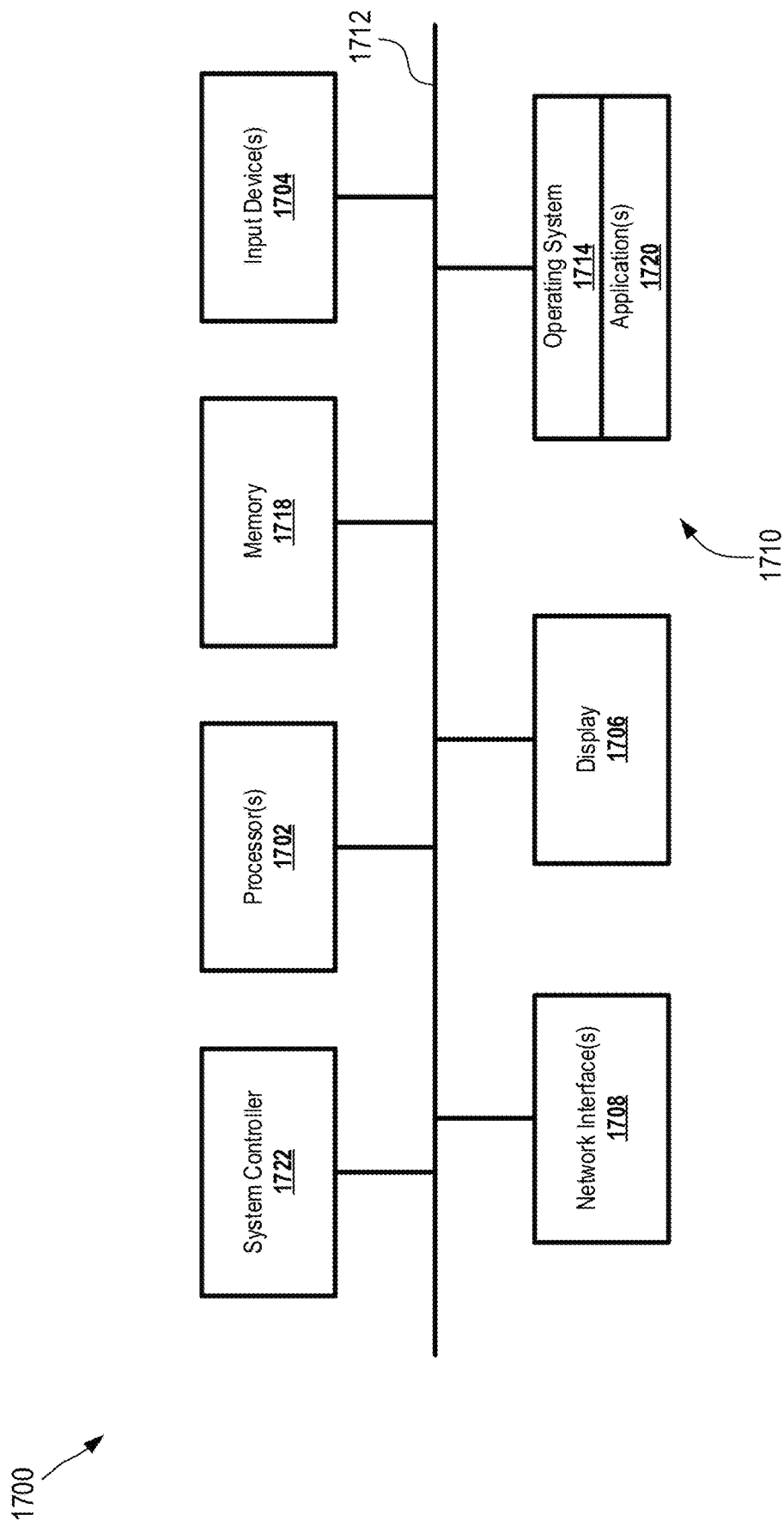
FIG. 17 is a block diagram of an example system architecture for implementing features and processes of the present disclosure.

FIG. 17 is a block diagram of an example system architecture 1700 for implementing features and processes of the present disclosure, such as those presented with reference to processes 1300, 1500, and 1600 of FIGS. 13, 15, and 16, respectively. The architecture 1700 can be used to implement a server (e.g., server 110 of FIG. 1), a user device (e.g., user device 102 of FIG. 1), a computing device (e.g., computing device 108 of FIG. 1), or any other suitable device for performing some or all of the aspects of the present disclosure. The architecture 1700 can be implemented on any electronic device that runs software applications derived from compiled instructions, including without limitation personal computers, servers, smart phones, electronic tablets, game consoles, email devices, and the like. In some implementations, the architecture 1700 can include one or more processors 1702, one or more input devices 1704, one or more display devices 1706, one or more network interfaces 1708, and one or more computer-readable mediums 1710. Each of these components can be coupled by bus 1712.

Display device 1706 can be any known display technology, including but not limited to display devices using Liquid Crystal Display (LCD) or Light Emitting Diode (LED) technology. Processor(s) 1702 can use any known processor technology, including but not limited to graphics processors and multi-core processors. Input device 1704 can be any known input device technology, including but not limited to a keyboard (including a virtual keyboard), mouse, track ball, and touch-sensitive pad or display. In some cases, audio inputs can be used to provide audio signals, such as audio signals of an individual speaking. Bus 1712 can be any known internal or external bus technology, including but not limited to ISA, EISA, PCI, PCI Express, NuBus, USB, Serial ATA or FireWire.

Computer-readable medium 1710 can be any medium that participates in providing instructions to processor(s) 1702 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 1710 can include various instructions for implementing operating system 1714 and applications 1720 such as computer programs. The operating system can be multi-user, multiprocessing, multitasking, multithreading, real-time and the like. The operating system 1714 performs basic tasks, including but not limited to: recognizing input from input device 1704; sending output to display device 1706; keeping track of files and directories on computer-readable medium 1710; controlling peripheral devices (e.g., storage drives, interface devices, etc.) which can be controlled directly or through an I/O controller; and managing traffic on bus 1712. Computer-readable medium 1710 can include various instructions for implementing firmware processes, such as a BIOS. Computer-readable medium 1710 can include various instructions for implementing any of the processes described herein, including but not limited to, at least processes 1300, 1500, and 1600 of FIGS. 13, 15, and 16, respectively.

Memory 1718 can include high-speed random access memory and/or non-volatile memory, such as one or more magnetic disk storage devices, one or more optical storage devices, and/or flash memory (e.g., NAND, NOR). The memory 1718 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 1718 can store an operating system, such as Darwin, RTXC, LINUX, UNIX, OS X, WINDOWS, or an embedded operating system such as VxWorks.

System controller 1722 can be a service processor that operates independently of processor 1702. In some implementations, system controller 1722 can be a baseboard management controller (BMC).

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

Any suitable function of the UPS can be implemented via an API. For example, an API can be used to implement translation of input text into the UPS alphabet. As another example, an API can be used to implement calculation of a complexity score for a given input text.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the invention. Thus, the breadth and scope of the present invention should not be limited by any of the above described embodiments.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

As used below, any reference to a series of examples is to be understood as a reference to each of those examples disjunctively (e.g., "Examples 1-4" is to be understood as "Examples 1, 2, 3, or 4").

Example 1 is a method, comprising: receiving input text, wherein the input text comprises a string of original graphemes in an original alphabet; generating a string of grapheme-phoneme combinations from the string of original graphemes; translating the string of grapheme-phoneme combinations into translation text using a translation alphabet, wherein the translation alphabet comprises a unique grapheme for every possible grapheme-phoneme combination of the original alphabet; and outputting the translation text.

Example 2 is the method of example(s) 1, wherein the input text includes at least one silent letter, wherein the translated text includes a translated grapheme associated with the silent letter, wherein the translated grapheme associated with the silent letter is indicative that the translated grapheme is non-voiced.

Example 3 is the method of example(s) 1 or 2, wherein, for a given grapheme of the original alphabet that is associated with a set of multiple phonemes, the translation alphabet includes a set of translation graphemes, wherein each of the translation graphemes is associated with a respective one of the set of multiple phonemes, and wherein each of the translation graphemes shares a basic shape with the given grapheme.

Example 4 is the method of example(s) 1-3, wherein the input text contains a word having letters, and wherein generating the string of grapheme-phoneme combinations from the string of original graphemes includes: accessing a phonetic spelling database containing a plurality of phonetic spellings associated with a plurality of words to retrieve a phonetic spelling for the word; and applying the phonetic spelling to the string of original graphemes to identify a valid grapheme-phoneme spelling for the word.

Example 5 is the method of example(s) 4, wherein the phonetic spelling contains a string of phonemes associated with the word, and wherein applying the phonetic spelling to the string of original graphemes to identify the valid grapheme-phoneme spelling for the word further includes: identifying, for each letter of the word, a set of allowable phonemes associated with the letter; and generating one or more valid grapheme-phoneme spellings for the word, wherein generating a valid grapheme-phoneme spelling for the word includes identifying, for each combination of each letter of the word and each phoneme of the string of phonemes, a match between the given phoneme and the set of allowable phonemes associated with the given letter.

Example 6 is the method of example(s) 5, wherein applying the phonetic spelling to the string of original graphemes to identify the valid grapheme-phoneme spelling for the word further includes: outputting at least one of the one or more valid grapheme-phoneme spellings; receiving selection information associated with the one or more valid grapheme-phoneme spellings; and selecting one of the one or more valid grapheme-phoneme spellings using the selection information.

Example 7 is the method of example(s) 5 or 6, wherein applying the phonetic spelling to the string of original graphemes to identify the valid grapheme-phoneme spelling for the word further includes: identifying a first spelling and a second spelling from the one or more valid grapheme-phoneme spellings; identifying an ambiguous phoneme from the phonetic spelling of the word, wherein the ambiguous phoneme is associated with a first letter in the first spelling and a second letter in the second spelling, wherein the first letter is different than the second letter; accessing phoneme-letter frequency information, wherein the phoneme-letter frequency information includes a frequency of which the ambiguous phoneme is represented by the first letter and a frequency of which the ambiguous phoneme is represented by the second letter; and selecting one of the first spelling and the second spelling based on the phoneme-letter frequency information.

Example 8 is the method of example(s) 7, wherein the first spelling is selected when the frequency of which the ambiguous phoneme is represented by the first letter is greater than the frequency of which the ambiguous phoneme is represented by the second letter, and wherein the second spelling is selected when the frequency of which the ambiguous phoneme is represented by the second letter is greater than the frequency of which the ambiguous phoneme is represented by the first letter.

Example 9 is the method of example(s) 7 or 8, wherein the phoneme-letter frequency information is generated by analyzing a collection of literary sources associated with the original alphabet to determine frequencies of which a given phoneme is represented by each letter of the original alphabet.

Example 10 is the method of example(s) 1-9, further comprising: generating, for each grapheme-phoneme combination of the string of grapheme-phoneme combinations, an individual complexity score; determining the highest individual complexity score from the individual complexity scores; and outputting the individual complexity score.

Example 11 is the method of example(s) 10, further comprising: identifying the grapheme-phoneme combination associated with the highest individual complexity score.

Example 12 is the method of example(s) 10 or 11, further comprising: determining a reading level based on the highest individual complexity score; and outputting the reading level.

Example 13 is the method of example(s) 10-12, further comprising: receiving a maximum desired complexity score; and identifying a subset of grapheme-phoneme combinations for the string of grapheme-phoneme combinations using the maximum desired complexity score and the individual complexity scores, wherein each grapheme-phoneme combination of the subset of grapheme-phoneme combinations is associated with an individual complexity score that exceeds the maximum desired complexity score.

Example 14 is the method of example(s) 13, further comprising: identifying a complex word from one or more words of the translated text, wherein the complex word includes one of the subset of grapheme-phoneme combinations; and suggesting a replacement word for the complex word using the complex word, wherein all grapheme-phoneme combinations of the replacement word have individual complexity scores at or below the maximum desired complexity score.

Example 15 is the method of example(s) 1-14, further comprising: generating, for a plurality of combinations of adjacent graphemes of the translated text, a combined complexity score; determining the highest combined complexity score from the combined complexity scores; and outputting the combined complexity score.

Example 16 is the method of example(s) 15, further comprising: identifying the combination of adjacent graphemes associated with the highest individual complexity score.

Example 17 is the method of example(s) 15 or 16, further comprising: determining a reading level based on the highest combined complexity score; and outputting the reading level.

Example 18 is the method of example(s) 15-17, wherein each of the combinations of adjacent graphemes is a word, and wherein the combined complexity score is a word complexity score.

Example 19 is the method of example(s) 18, further comprising: receiving a maximum desired complexity score; and identifying a complex word from the translated text, wherein the complex word has a word complexity score that exceeds the maximum desired complexity score.

Example 20 is the method of example(s) 19, further comprising: suggesting a replacement word for the complex word using the complex word, wherein the replacement word has a word complexity score at or below the maximum desired complexity score.

Example 21 is the method of example(s) 1-20, wherein the string of original graphemes of the input text contains at least a first input grapheme and a second input grapheme, wherein the first input grapheme is visually indistinguishable from the second input grapheme, wherein the first input grapheme is associated with a first phoneme, wherein the second input grapheme is associated with a second phoneme, and wherein the first phoneme is different from the second phoneme.

Example 22 is a system comprising: one or more data processors; and a non-transitory computer-readable storage medium containing instructions which, when executed on the one or more data processors, cause the one or more data processors to perform operations to implement the method of example(s) 1-21.

Example 23 is a computer-program product tangible embodied in a non-transitory machine-readable storage medium, including instructions which, when executed by a computer, cause the computer to carry out the method of example(s) 1-21.

What is claimed is:

1. A method, comprising:
presenting, on a computing device, an interface, wherein presenting the interface includes presenting an input box;
receiving input text via the interface, wherein the input text comprises a string of original graphemes in an original alphabet, the string of original graphemes having a length of n original graphemes of the original alphabet, n being greater than one, and wherein receiving the input text includes receiving the input text via the input box;
providing the input text to a translation module of the computing device;
analyzing the provided input text to generate a string of grapheme-phoneme combinations from the string of original graphemes, the string of grapheme-phoneme combinations having a length of n grapheme-phoneme combinations, wherein generating the string of grapheme-phoneme combinations includes, for each grapheme of the original graphemes, identifying a single respective phoneme associated with the original grapheme, wherein the input text contains a word having letters, and wherein generating the string of grapheme-phoneme combinations from the string of original graphemes further includes:
accessing a phonetic spelling database containing a plurality of phonetic spellings associated with a plurality of words to retrieve a phonetic spelling for the word, the phonetic spelling containing a string of phonemes associated with the word; and
applying the phonetic spelling to the string of original graphemes to identify a valid grapheme-phoneme spelling for the word, wherein applying the phonetic spelling to the string of original graphemes to identify the valid grapheme-phoneme spelling for the word further includes:
identifying, for each letter of the word, a set of allowable phonemes associated with the letter;
generating one or more valid grapheme-phoneme spellings for the word, wherein generating a valid grapheme-phoneme spelling for the word includes identifying, for each combination of each letter of the word and each phoneme of the string of phonemes, a match between the given phoneme and the set of allowable phonemes associated with the given letter;

outputting a first at least one of the one or more valid grapheme-phoneme spellings via the input box;

presenting a variation indicator in association with the outputted first one of the one or more valid grapheme-phoneme spellings, wherein the variation indicator is indicative that the one or more valid grapheme-phoneme spellings includes at least a second one of the one or more valid grapheme-phoneme spellings;

receiving user input indicative of hovering over or clicking the variation indicator or the first one of the one or more valid grapheme-phoneme spellings;

automatically presenting, in response to receiving the user input, the second one of the one or more valid grapheme-phoneme spellings;

receiving additional user input indicative of a selection of the second one of the one or more valid grapheme-phoneme spellings; and selecting, in response to receiving the additional user input, the second one of the one or more valid grapheme-phoneme spellings for use as the identified valid grapheme-phoneme spelling;

translating the string of grapheme-phoneme combinations into translation text using a translation alphabet, wherein the translation alphabet comprises a unique translation grapheme for every possible grapheme-phoneme combination of the original alphabet; and outputting the translation text via the interface, the translation text having a length of n translation graphemes of the translation alphabet.

2. The method of claim 1, wherein the input text includes at least one silent letter, wherein the translated text includes a translated grapheme associated with the silent letter, wherein the translated grapheme associated with the silent letter is indicative that the translated grapheme is non-voiced.

3. The method of claim 1, wherein, for a given single grapheme of the original alphabet that is associated with a set of multiple phonemes, the translation alphabet includes a set of translation graphemes, wherein each of the translation graphemes is associated with a respective one of the set of multiple phonemes, and wherein each of the translation graphemes shares a basic shape with the given single grapheme.

4. The method of claim 1, wherein applying the phonetic spelling to the string of original graphemes to identify the valid grapheme-phoneme spelling for the word further includes:

identifying a first spelling and a second spelling from the one or more valid grapheme-phoneme spellings;

identifying an ambiguous phoneme from the phonetic spelling of the word, wherein the ambiguous phoneme is associated with a first letter in the first spelling and a second letter in the second spelling, wherein the first letter is different than the second letter;

accessing phoneme-letter frequency information, wherein the phoneme-letter frequency information includes a frequency of which the ambiguous phoneme is represented by the first letter and a frequency of which the ambiguous phoneme is represented by the second letter; and selecting one of the first spelling and the second spelling based on the phoneme-letter frequency information.

5. The method of claim 4, wherein the phoneme-letter frequency information is generated by analyzing a collection of literary sources associated with the original alphabet to determine frequencies of which a given phoneme is represented by each letter of the original alphabet, the collection of literary sources being associated with a given age range, the literary sources in the collection of literary sources being designed for the given age range.

6. The method of claim 1, further comprising:

generating, for each grapheme-phoneme combination of the string of grapheme-phoneme combinations, an individual complexity score;

determining the highest individual complexity score from the individual complexity scores; and outputting the individual complexity score.

7. The method of claim 6, wherein generating the individual complexity scores occurs dynamically in response to providing the input text to the translation module, the method further comprising:

dynamically determining a reading level based on the highest individual complexity score; and outputting the reading level.

8. The method of claim 6, further comprising:

receiving a maximum desired complexity score; and identifying a subset of grapheme-phoneme combinations for the string of grapheme-phoneme combinations using the maximum desired complexity score and the individual complexity scores, wherein each grapheme-phoneme combination of the subset of grapheme-phoneme combinations is associated with an individual complexity score that exceeds the maximum desired complexity score.

9. The method of claim 8, further comprising:

identifying a complex word from one or more words of the translated text, wherein the complex word includes one of the subset of grapheme-phoneme combinations;

generating one or more replacement words for the complex word using the complex word, wherein all grapheme-phoneme combinations of each of the one or more replacement words have individual complexity scores at or below the maximum desired complexity score; and suggesting at least one of the one or more replacement words in response to identifying the complex word.

10. The method of claim 1, further comprising:

generating, for a plurality of combinations of adjacent graphemes of the translated text, a combined complexity score;

determining the highest combined complexity score from the combined complexity scores; and outputting the combined complexity score.

11. The method of claim 10, further comprising identifying the combination of adjacent graphemes associated with the highest combined complexity score.

12. The method of claim 10, further comprising:

determining a reading level based on the highest combined complexity score; and outputting the reading level.

13. The method of claim 10, wherein each of the combinations of adjacent graphemes is a word, wherein the combined complexity score is a word complexity score, and wherein the method further comprises:

receiving a maximum desired complexity score; and identifying a complex word from the translated text, wherein the complex word has a word complexity score that exceeds the maximum desired complexity score.

14. The method of claim 13, further comprising:
suggesting a replacement word for the complex word using the complex word, wherein the replacement word has a word complexity score at or below the maximum desired complexity score.

15. The method of claim 1, wherein the string of original graphemes of the input text contains at least a first input grapheme and a second input grapheme, wherein the first input grapheme is visually indistinguishable from the second input grapheme, wherein the first input grapheme is associated with a first phoneme, wherein the second input grapheme is associated with a second phoneme, and wherein the first phoneme is different from the second phoneme.

16. The method of claim 1, wherein outputting the translation text includes outputting the selected second one of the one or more valid grapheme-phoneme spellings via an output box associated with the input box.

17. The method of claim 1, wherein analyzing the provided input text, translating the at least one grapheme-phoneme combination, and outputting the translation text occur dynamically in response to receiving the input text via the interface.

18. The method of claim 1, wherein the original alphabet contains a plurality of potential original graphemes, wherein each of the plurality of potential original graphemes of the original alphabet represents a smallest contrastive unit of the original alphabet, and wherein at least one of the plurality of potential original graphemes is associated with multiple potential phonemes.

19. A system comprising:
one or more data processors; and
a non-transitory computer-readable storage medium containing instructions which, when executed on the one or more data processors, cause the one or more data processors to perform operations to implement the method of claim 1.

20. A computer-program product tangible embodied in a non-transitory machine-readable storage medium, including instructions which, when executed by a computer, cause the computer to carry out the method of claim 1.

* * * * *